United States Patent
Takeuchi et al.

(10) Patent No.: US 8,100,210 B2
(45) Date of Patent: Jan. 24, 2012

(54) ELECTRICALLY DRIVEN INDUSTRIAL VEHICLE

(75) Inventors: Akio Takeuchi, Nagano (JP); Yoshihide Shimada, Nagano (JP); Masao Yoshioka, Nagano (JP); Yutaka Yamazaki, Nagano (JP); Akira Yamamoto, Nagano (JP)

(73) Assignee: Takeuchi Mfg. Co., Ltd (JP)

( * ) Notice: Subject to any disclaimer, the term of this patent is extended or adjusted under 35 U.S.C. 154(b) by 675 days.

(21) Appl. No.: 12/162,533

(22) PCT Filed: Feb. 2, 2007

(86) PCT No.: PCT/JP2007/052296
§ 371 (c)(1),
(2), (4) Date: Jul. 29, 2008

(87) PCT Pub. No.: WO2007/091664
PCT Pub. Date: Aug. 16, 2007

(65) Prior Publication Data
US 2009/0314557 A1    Dec. 24, 2009

(30) Foreign Application Priority Data

| Feb. 7, 2006 | (JP) | 2006-029148 |
| Feb. 7, 2006 | (JP) | 2006-029149 |
| Feb. 7, 2006 | (JP) | 2006-029150 |
| Feb. 7, 2006 | (JP) | 2006-029417 |
| Mar. 30, 2006 | (JP) | 2006-093024 |
| Mar. 30, 2006 | (JP) | 2006-093036 |
| Mar. 30, 2006 | (JP) | 2006-093049 |

(51) Int. Cl.
*B60R 16/04* (2006.01)
*B60K 1/00* (2006.01)

(52) U.S. Cl. ............ 180/68.5; 180/65.1

(58) Field of Classification Search ............ 180/65.1, 180/65.21, 65.22, 305, 306, 307, 68.5; 429/96, 429/99, 100; 318/139
See application file for complete search history.

(56) References Cited

U.S. PATENT DOCUMENTS
5,423,654 A * 6/1995 Rohrbaugh .......... 414/686
(Continued)

FOREIGN PATENT DOCUMENTS
EP        879920 A2 * 11/1998
(Continued)

OTHER PUBLICATIONS

Chinese Office Action dated Feb. 10, 2011; Chinese Patent Application No. 200780004755.7.

(Continued)

*Primary Examiner* — J. Allen Shriver, II
*Assistant Examiner* — Jacob Meyer
(74) *Attorney, Agent, or Firm* — Studebaker & Brackett PC; Donald R. Studebaker

(57) ABSTRACT

An electrically driven industrial vehicle comprising a revolving body (11) attached to a undercarriage (7) so as to be able to turn horizontally; a power shovel device (20) for receiving a hydraulic drive force and operating, the power shovel device being mounted on the revolving body (11); and a hydraulic drive force generating unit provided to the revolving body (11), for generating hydraulic drive force for operating the power shovel device (20). The hydraulic drive force generating unit has a hydraulic fluid tank (73) for storing hydraulic fluid; a hydraulic pump (14) for feeding the hydraulic fluid in the hydraulic fluid tank to the power shovel device (20); an electric motor (13) for driving the hydraulic pump; and a lithium ion battery (50) for feeding electrical drive power to the electric motor.

10 Claims, 25 Drawing Sheets

U.S. PATENT DOCUMENTS

| | | | |
|---|---|---|---|
| 5,563,479 A * | 10/1996 | Suzuki | 318/139 |
| 5,983,612 A * | 11/1999 | Bauswell et al. | 56/11.9 |
| 6,170,587 B1 * | 1/2001 | Bullock | 180/69.6 |
| 6,329,772 B1 * | 12/2001 | Ochiai et al. | 318/139 |
| 6,345,677 B1 * | 2/2002 | Eckersley et al. | 180/68.5 |
| 6,705,030 B2 * | 3/2004 | Tokunaga | 37/348 |
| 6,834,737 B2 * | 12/2004 | Bloxham | 180/165 |
| 6,864,663 B2 * | 3/2005 | Komiyama et al. | 320/104 |
| 7,134,519 B2 * | 11/2006 | Imashige | 180/69.24 |
| 7,182,164 B2 * | 2/2007 | Merlo | 180/68.1 |
| 7,513,326 B2 * | 4/2009 | Miyachi | 180/68.4 |
| 7,525,206 B2 * | 4/2009 | Kagoshima et al. | 290/40 C |
| 7,900,722 B2 * | 3/2011 | Shimada et al. | 180/6.48 |
| 2001/0013437 A1 * | 8/2001 | Husted et al. | 180/65.1 |
| 2001/0041952 A1 * | 11/2001 | Nada | 701/22 |
| 2002/0053479 A1 * | 5/2002 | Wakitani et al. | 180/315 |
| 2002/0104239 A1 * | 8/2002 | Naruse et al. | 37/348 |
| 2003/0209375 A1 * | 11/2003 | Suzuki et al. | 180/65.3 |
| 2004/0157117 A1 * | 8/2004 | Tamaki et al. | 429/99 |
| 2004/0173395 A1 * | 9/2004 | Arai et al. | 180/68.1 |
| 2004/0188157 A1 * | 9/2004 | Miyachi | 180/68.4 |
| 2004/0238239 A1 * | 12/2004 | Wakitani et al. | 180/6.5 |
| 2005/0039964 A1 * | 2/2005 | Goyry | 180/243 |
| 2005/0266303 A1 * | 12/2005 | Kadouchi et al. | 429/92 |
| 2006/0144887 A1 * | 7/2006 | Czernietzki | 224/902 |
| 2007/0187180 A1 * | 8/2007 | Kagoshima et al. | 182/232 |
| 2008/0006459 A1 * | 1/2008 | Niebuhr | 180/68.5 |
| 2009/0173554 A1 * | 7/2009 | Yoshioka | 180/65.8 |
| 2009/0261761 A1 * | 10/2009 | Yoshioka | 318/139 |
| 2009/0314557 A1 * | 12/2009 | Takeuchi et al. | 180/65.1 |
| 2010/0126786 A1 * | 5/2010 | Stemler et al. | 180/9.1 |
| 2010/0224426 A1 * | 9/2010 | Shimada et al. | 180/6.5 |

FOREIGN PATENT DOCUMENTS

| | | |
|---|---|---|
| EP | 0 879 920 B1 | 8/2005 |
| JP | 09-144062 | 6/1997 |
| JP | H09-144061 A | 6/1997 |
| JP | 10-317429 | 12/1998 |
| JP | 11-021948 | 1/1999 |
| JP | 2002-227241 A | 8/2002 |
| JP | 2005-273145 A | 10/2005 |

OTHER PUBLICATIONS

Japanese Office Action "Notification of Reasons for Rejection" with mailing date of Mar. 11, 2011; Japanese Patent Application No. 2008-058981.

International Search Report for PCT/JP2007/052296, mailed May 1, 2007.

* cited by examiner

Fig. 1
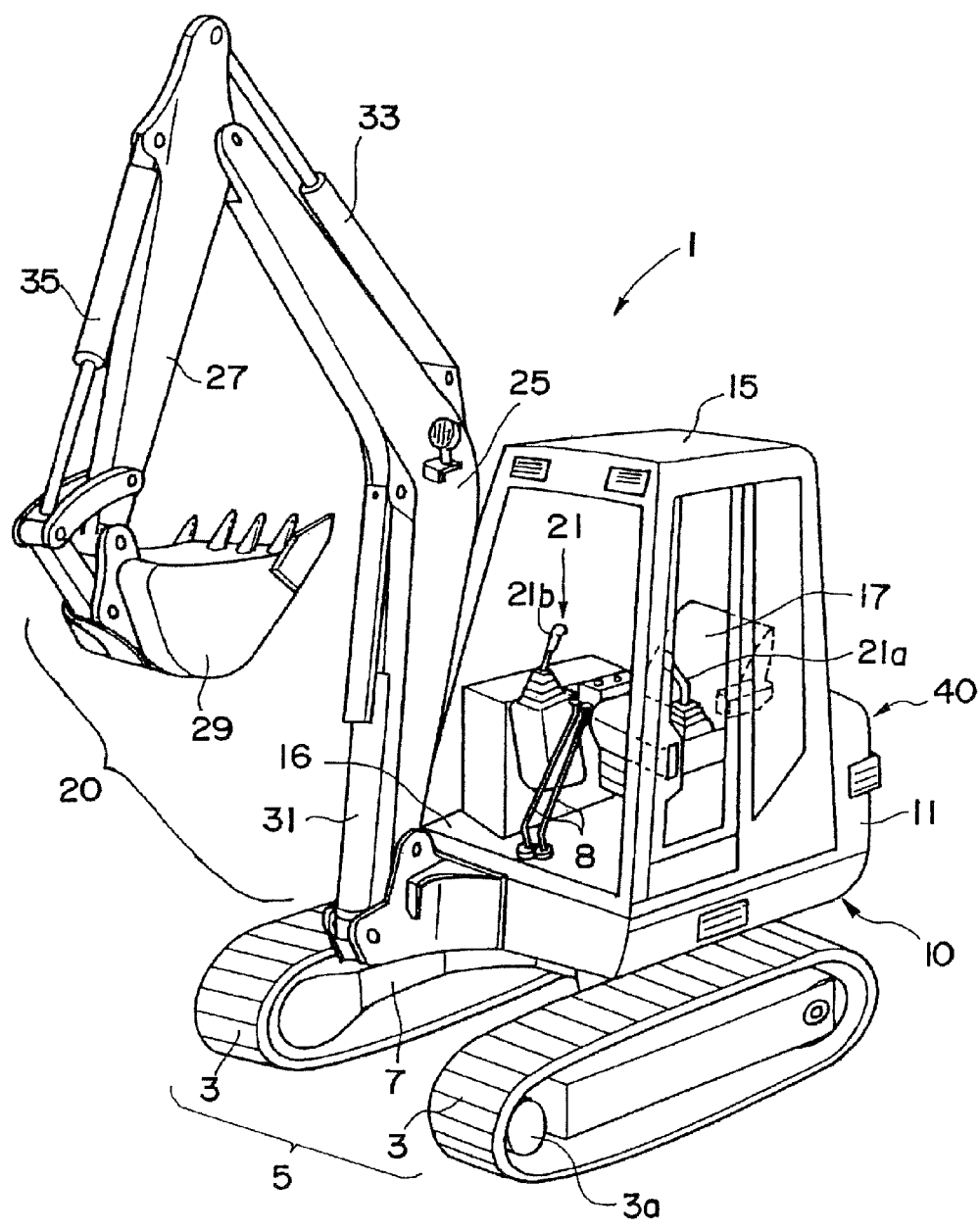
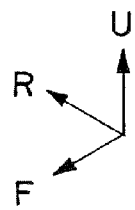

Fig. 6
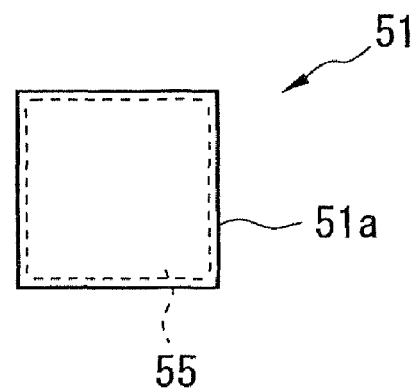
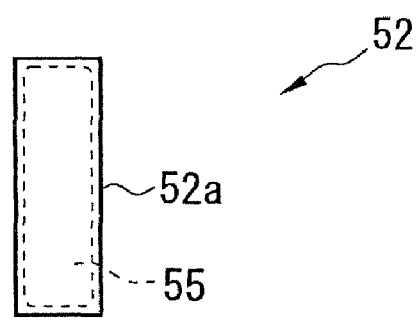
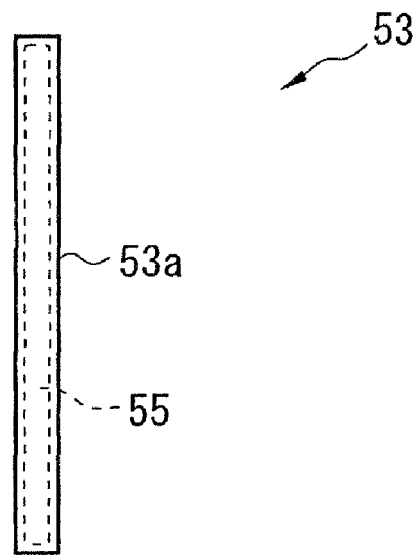

ELECTRICALLY DRIVEN INDUSTRIAL VEHICLE

TECHNICAL FIELD

The present invention relates to an electrically driven industrial vehicle composed of a vehicle body attached on a traveling body, an implement attached to the vehicle body that receives hydraulic drive force and operates, and a hydraulic drive force generating unit for generating hydraulic drive force for operating the implement, wherein the hydraulic force generating unit is driven by a battery, a high-capacity capacitor, or other power storage means. The present invention more particularly relates to an electrically driven industrial vehicle in which the vehicle body is composed of a revolving body attached on the traveling body so as to be able to turn horizontally via a revolving mechanism.

TECHNICAL BACKGROUND

An example of such an industrial vehicle is an industrial vehicle such as a power-shovel-type industrial vehicle that is capable of excavating a ground surface (see Japanese Laid-open Patent Application No. 2005-273145 for example). In this industrial vehicle, a revolving body is provided that is supported on a traveling body so as to be able to rotate (i.e., turn horizontally) about an axis that extends in the vertical direction, and an implement (power shovel device) having a pivoting boom is attached to the front part of the revolving body. An engine room covered by a hood and accommodating an engine is provided to the rear part of the revolving body. Also provided along with the engine are a radiator, an oil cooler, a hydraulic pump, and also a hydraulic fluid tank for storing the hydraulic fluid of the hydraulic device, a revolving motor for turning the revolving body, and other components. A counterweight is also provided to the rear part of the revolving body in order to balance the weight of the power shovel device provided to the front part of the revolving body, and to enable the power shovel device and the revolving body to stably operate.

In conventional designs, the power source of such an industrial vehicle as the one described above is an engine (internal combustion engine), the traveling body is caused to travel by the engine, and a hydraulic pump for supplying oil pressure for operating the power shovel device, the revolving motor, or the like is also driven by the engine. There have also recently been industrial vehicles in which, out of consideration for effects on the surrounding environment, the hydraulic pump is driven by an electric motor rather than the engine to operate the implement, so as not to emit exhaust gas or make a large amount of noise. In this case, an electric motor provided inside the revolving body is connected to a commercial power supply or a power generator via a power supply cable, and thus receives electrical power.

Problems to be Solved by the Invention

However, in an electric motor-type industrial vehicle such as the one described above, the commercial power supply or power generator must be placed nearby, and the implement is difficult to operate when the commercial power supply or power generator are not present. Since a power supply cable is also connected to the industrial vehicle, the range in which the industrial vehicle can move is determined by the length of the power supply cable, and the operating range of the industrial vehicle is limited. Furthermore, there is a risk of the power supply cable being broken by tension on the power supply cable during operation.

For such reasons, the use of a battery instead of a commercial power supply or a power generator has been considered in order to feed electrical power to the electric motor, but such problems as those described below occur in this case. Specifically, since a large-capacity battery is needed to maintain operation of the electric motor for long periods of time when long operating times are involved, the volume and weight of the battery mounted in the revolving body naturally increase. The mounting in the revolving body becomes limited when the volume of the battery increases, and even when the space can be secured, the battery has a large weight, the center of gravity of the revolving body therefore shifts, and the stability of the vehicle body of the industrial vehicle is difficult to maintain. Furthermore, when the weight of the battery is large, the strength of the revolving body must be increased, and the battery is also extremely difficult to replace.

When such a heavy battery can be made to function as the counterweight, increased electric capacity and enhanced mountability can both be anticipated, and reduction of the total weight of the industrial vehicle may also be anticipated. However, the counterweight is commonly molded in the shape of a curved surface that conforms to the rear end surface of the revolving body, and in order to use the battery as the counterweight, there is a need to form the rear wall surface of the battery as a curved surface, and to mold the battery into a complex three-dimensional shape.

OBJECTS OF THE INVENTION

In view of such problems as those described above, an object of the present invention to provide a small-sized, compact-structured electrically driven industrial vehicle having an electrically driven hydraulic implement driven by a battery, high-capacity capacitor, or other power storage means, and that is capable of working for a long period of time.

A particular object of the present invention is to provide an electrically driven revolving industrial vehicle in which a hydraulic implement is mounted on a vehicle body (revolving body) that can turn horizontally.

A further object of the present invention is to provide an electrically driven industrial vehicle in which a battery is positioned with good weight balance while effectively utilizing the space inside the vehicle body or the revolving body.

A further object of the present invention is to provide an electrically driven industrial vehicle in which an electric motor, a hydraulic pump, a hydraulic fluid tank, a battery, and other components constituting a hydraulic implement are arranged so as to effectively utilize the space inside the vehicle body or the revolving body.

Means to Solve the Problems

The electrically driven industrial vehicle according to the present invention comprises a vehicle body provided on a traveling body; an implement for receiving a hydraulic drive force and operating, the implement being attached to the vehicle body; and a hydraulic drive force generating unit for generating the hydraulic drive force for operating the implement, the hydraulic drive force generating unit being provided to the vehicle body. The hydraulic drive force generating unit has a hydraulic fluid tank for storing hydraulic fluid; a hydraulic pump for feeding the hydraulic fluid in the hydraulic fluid tank to the implement; an electric motor for driving the hydraulic pump; and power storage means for feeding electric drive power to the electric motor; and the power storage means is composed of at least one of a high-capacity secondary battery and a high-capacity capacitor.

The high-capacity secondary battery is preferably composed of a lithium ion battery or an organic radical battery.

In another preferred configuration, a battery storage part is formed for storing the power storage means in the vehicle body; and a battery storage opening that opens facing the battery storage part is formed in an external peripheral surface of the vehicle body, and the power storage means can be inserted into and withdrawn from the battery storage part through the battery storage opening.

In another preferred configuration, the vehicle body is composed of a revolving body attached on the traveling body so as to be able to turn horizontally via a revolving mechanism.

In another preferred configuration, at least a portion of an external peripheral surface of the revolving body is formed as a surface curved about an axis of revolution thereof, the battery storage part is formed in a curved surface along the external peripheral surface inside the revolving body, the power storage means is composed of a plurality of battery cells, and the plurality of battery cells is arranged in a line along an external peripheral surface of the curved surface inside the battery storage part.

In another preferred configuration, the implement is attached to a front part of the revolving body; and an external peripheral surface of a rear part of the revolving body is formed in a curved surface, the battery storage part is formed along the curved surface, and the power storage means accommodated in the battery storage part functions as a counterweight.

In another preferred configuration, the power storage means is composed of a plurality of electrically connected battery cells having mutually equal electrical capacities; and the plurality of battery cells has equal surface areas and different shapes as viewed from above, is formed in columnar shapes having equal thickness dimensions, and is configured to have mutually equal volumes.

In another preferred configuration, a battery storage part having a prescribed shape is formed within the vehicle body, and the plurality of battery cells is arranged compactly and efficiently as a combination of the plurality of different shapes in conformity to the shape of the battery storage part.

In this case, the plurality of battery cells is preferably arranged in a plurality of tiers disposed one above another inside the battery storage part.

The electric motor is preferably disposed upright so that a rotating shaft direction of the electric motor substantially coincides with a vertical direction of the vehicle body, the hydraulic pump and the electric motor are preferably disposed in a line above and below in a vertical direction of the vehicle frame, and the power storage means is preferably stored and disposed in the battery storage part positioned farther rearward than the hydraulic pump and the electric motor, in a position toward a rear end of an inside of the vehicle body.

The power storage means is preferably stored and disposed in a pair of battery storage parts positioned in a lower part of the inside of the vehicle body on left and right sides thereof, and the hydraulic pump, the electric motor, and the hydraulic fluid tank are preferably disposed inside the vehicle body and in a position above the pair of battery storage parts.

The power storage means is preferably disposed in a line in a planar shape on a bottom surface (stump) of the vehicle body.

The power storage means is preferably disposed in a line in a planar shape in a lower part of a bottom surface of the vehicle body.

Advantageous Effects of the Invention

According to the electrically driven industrial vehicle of the present invention, a high-capacity secondary battery or a high-capacity capacitor that is lightweight and charges in a short time in comparison to a conventional secondary battery is used as the battery for feeding electrical power for operating the implement. The industrial vehicle can therefore be made small-sized and compact, and the weight thereof can be reduced. Furthermore, the battery can easily be replaced, recharging can be performed quickly, and work efficiency can be increased.

Connecting and disconnecting of electricity, and replacement can be performed easily and simply particularly through a configuration in which the power storage means is inserted into the battery storage opening, and can be inserted into and withdrawn from the battery storage part.

In the case of a revolving system in which a revolving body capable of turning horizontally is attached on a traveling body, because the external peripheral surface of the revolving body is a curved surface, and the turning radius is reduced, a plurality of battery cells constituting the high-capacity secondary battery can be efficiently arranged along the external peripheral surface of the curved surface, and the traveling body can be made small-sized and compact.

The high-capacity secondary battery is also stored and disposed as a counterweight in the battery storage part positioned toward the rear end of the revolving body, and the weight of the implement attached to the front part of the revolving body can be appropriately balanced by the high-capacity secondary battery. Furthermore, since the high-capacity secondary battery has the role of a counterweight, there is no longer a need to maintain the space for positioning the counterweight that was necessary in the conventional technique within the vehicle body frame or the revolving body, and a commensurately larger space can be maintained for such devices as the hydraulic pump or the electric motor.

By using a lithium ion battery or an organic radical battery as the high-capacity secondary battery, using a high-capacity capacitor instead of the high-capacity secondary battery, or using a secondary battery system having a composite structure in which a high-capacity secondary battery and a high-capacity capacitor are combined, the same voltage can be supplied by a battery that has a smaller volume than a conventional lead battery as the battery of the industrial vehicle, and the space occupied by the battery in the vehicle body frame or the revolving body can be reduced. A commensurately larger space can be maintained for placement of the hydraulic pump, the electric motor, or the like. Any of a lithium ion battery and an organic radical battery may be used as the high-capacity rechargeable battery, but the battery can be further reduced in weight particularly when an organic radical battery is used, and the battery can be charged in a shorter time. A composite configuration of a high-capacity secondary battery and a high-capacity capacitor makes it possible to reduce voltage drops due to sudden overload. This is an effective means when the battery capacity of the lithium ion battery or the organic radical battery is reduced.

BRIEF DESCRIPTION OF THE DRAWINGS

FIG. 1 is a perspective view showing a power shovel industrial vehicle as the electrically driven industrial vehicle according to Example 1 of the present invention;

FIG. 6 is a plan view showing different examples of battery cells;

DESCRIPTION OF THE PREFERRED EMBODIMENT

Figure 2:
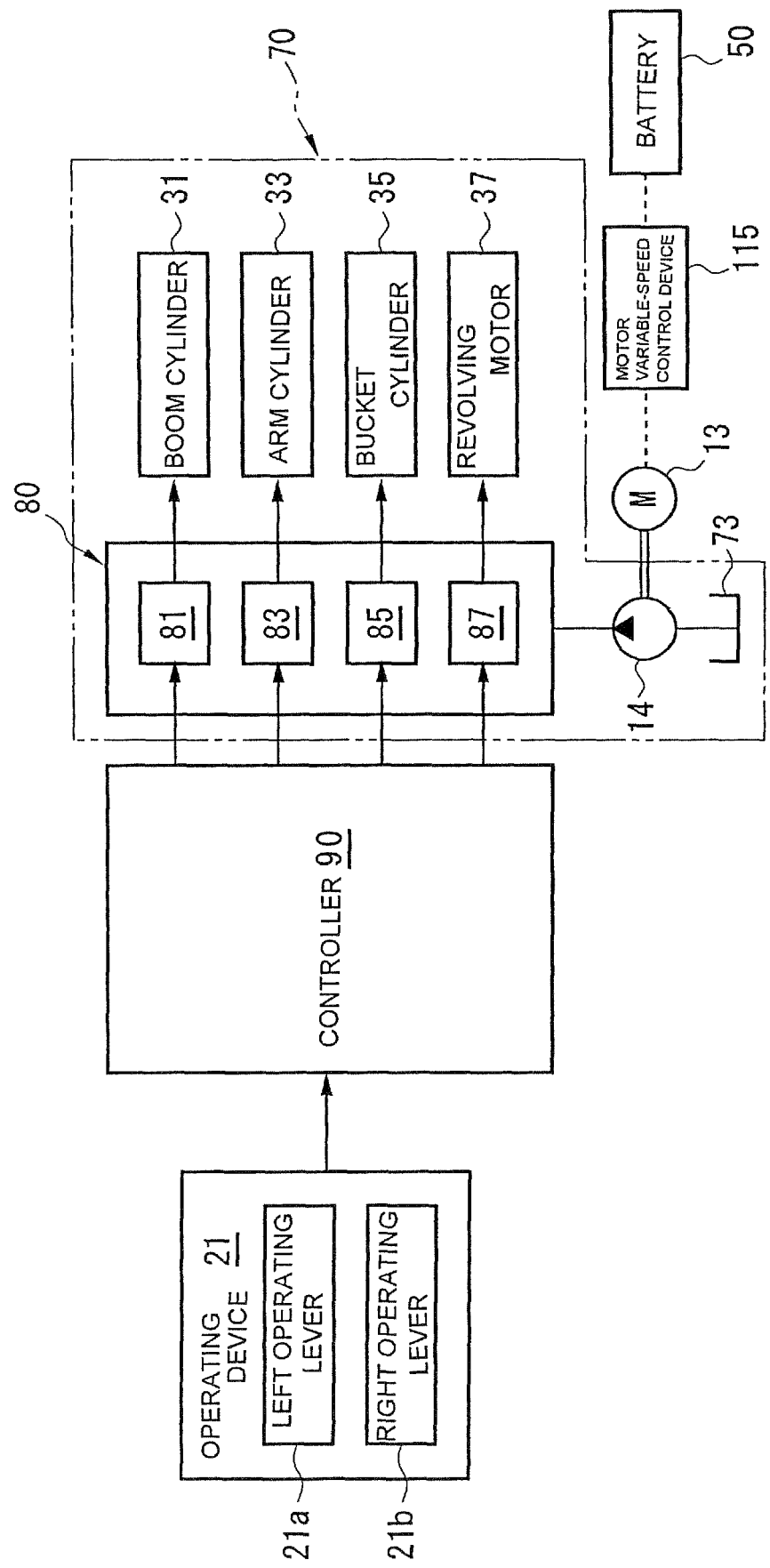
FIG. 2 is a block diagram showing the structure of the hydraulic device or the like provided to the industrial vehicle according to Example 1.

Preferred embodiments of the present invention will be described hereinafter based on the drawings. A power-shovel-type industrial vehicle used for excavating soil or moving excavated dirt or the like will be described as an example of the electrically driven industrial vehicle according to the present embodiment. The direction indicated by the arrow U in the drawings is the upward direction, the direction of the arrow F is the forward direction, and the direction of the arrow R is the right direction, and these directions correspond to directions in which the operator looks when the revolving body 11 of the industrial vehicle on a horizontal surface is in the reference position (the position shown in FIG. 1).

Example 1

A first example of the abovementioned power-shovel-type industrial vehicle will first be described with reference to FIGS. 1 through 5. As shown in FIG. 1, the power shovel industrial vehicle 1 has a undercarriage 7 provided with a travel device 5 that has a pair of left and right crawler tracks 3, 3; a revolving body 11 constituting a vehicle body frame that is provided so as to be able to turn on the undercarriage 7; a power shovel device (implement) 20 pivotally connected to the front part of the revolving body 11; and an operator cabin 15 provided to the upper part of the revolving body 11. The revolving body 11 is driven by a revolving motor 37 and can turn horizontally, and the periphery thereof is covered by a cover 40.

The left and right crawler tracks 3, 3 are each driven by a hydraulic motor 3a (and a deceleration mechanism not shown) that is rotationally driven by receiving hydraulic fluid that is fed from a hydraulic pump 14 described hereinafter. However, an electric motor that is driven by receiving a supply of electric power from the battery 50 described hereinafter may also be used instead of the hydraulic motor 3a.

The power shovel device 20 has a vertically pivoting boom 25 whose proximal end is pivotally connected to the lower part of the front end of the revolving body 11; a vertically pivoting arm 27 pivotally connected to the distal end of the boom 25; and a bucket 29 pivotally connected so as to be able to pivot up and down at the distal end of the arm 27; and the power shovel device 20 is turned in conjunction with the turning of the revolving body 11. The boom 25 can be hoisted by a hydraulically driven boom cylinder 31 that is pivotally connected between the lower surface of the boom 25 and the bottom front end of the revolving body 11, the arm 27 can be flexed and extended by a hydraulically driven arm cylinder 33 that is pivotally connected between the proximal part of the arm 27 and the upper surface of the boom 25, and the bucket 29 can be pivoted up and down by a hydraulically driven bucket cylinder 35 that is pivotally connected between the proximal part of the bucket 29 and the upper surface of the arm 27.

In the operator cabin 15, an operator seat 17 is provided in which an operator (not shown) sits facing the power shovel device 20. A pair of travel operating levers 8, 8 for operating the driving of the left and right crawler tracks 3 are provided on a floor panel 16 in the operator cabin 15 at the end part in front of the operator seat 17 (toward the power shovel device 20). An operating device 21 for operating the driving of the power shovel device 20 is disposed on the left and right of the operator seat 17. The operating device 21 has a left operating lever 21a and a right operating lever 21b, and the operating levers 21a, 21b are configured so as to be able to tilt forward, backward, left, and right. Both of the operating levers 21a, 21b can tilt forward, backward, left, and right, and are provided at the base thereof with potentiometers, limit switches, or other detectors (not shown). When the operating levers

21*a*, 21*b* are tilted, the detectors output an operation detection signal indicating the tilt direction to a controller 90 (FIG. 2).

As shown in FIG. 2, the power shovel industrial vehicle 1 according to the present example is provided with the controller 90 for operationally controlling the power shovel device 20 or the undercarriage 7, and a hydraulic device 70 for feeding hydraulic fluid to hydraulic actuators. The hydraulic actuators include the boom cylinder 31, the arm cylinder 33, and the bucket cylinder 35 of the power shovel device 20, and the revolving motor 37 of the revolving body 11, and also hydraulic motors (not shown) for driving the crawler tracks 3, 3.

The hydraulic device 70 has an oil tank 73 for storing hydraulic fluid; a hydraulic pump 14 driven by an electric motor 13 to which electrical power is fed from the battery 50; and electromagnetically driven hydraulic control valves 80 provided so as to each correspond to a hydraulic actuator, for controlling the feeding of hydraulic fluid to the corresponding hydraulic actuators; and when the hydraulic pump 14 is driven, the hydraulic fluid stored in the oil tank 73 is fed to the hydraulic actuators via the hydraulic control valves 80. The hydraulic control valves 80 are composed of a boom control valve 81 that corresponds to the boom cylinder 31; an arm control valve 83 that corresponds to the arm cylinder 33; a bucket control valve 85 that corresponds to the bucket cylinder 35; a revolution control valve 87 that corresponds to the revolving motor 37; and a travel control valve (not shown) that corresponds to the hydraulic motor for driving the crawler tracks 3, 3. The hydraulic device 70 is provided with an oil cooler 71 (FIG. 3), and is configured so as to be capable of managing the oil temperature.

The controller 90 is a microcomputer in which a CPU, an input/output interface, and other components are packaged on a substrate, and is configured so as to receive the inputting of operation detection signals from the detectors of the operating levers 21*a*, 21*b*, output operation control signals to the hydraulic control valves 80 on the basis of the inputted operation detection signals, and control the operation of the hydraulic control valves 80. The operation of the revolving motor 37 and the extension and retraction of the boom cylinder 31, arm cylinder 33, and bucket cylinder 35 are thereby controlled in accordance with the operation of the operating device 21 (tilting of the operating levers 21*a*, 21*b*), and the boom 25, arm 27, bucket 29, and revolving body 11 operate according to the operation of the operating device 21. When a control signal is outputted from the controller 90 to a motor variable-speed control device 115, the speed of the electric motor 13 is thereby varied and controlled so that the electric motor 13 outputs the appropriate torque.

According to this operational control of the hydraulic device 70 by the controller 90, the arm 27 flexes upward when the left operating lever 21*a* is tilted forward in the front-rear direction, the arm 27 flexes downward when the left operating lever 21*a* is tilted rearward in the front-rear direction, the revolving body 11 turns left when the left operating lever 21*a* is tilted to the left in the left-right direction, and the revolving body 11 turns right when the left operating lever 21*a* is tilted to the right in the left-right direction. The boom 25 moves down when the right operating lever 21*b* is tilted forward in the front-rear direction, the boom 25 moves up when the right operating lever 21*b* is tilted rearward in the front-rear direction, the bucket 29 scoops when the right operating lever 21*b* is tilted to the left in the left-right direction, and the bucket 29 empties when the right operating lever 21*b* is tilted to the right in the left-right direction.

The operating device 21 is configured so that the left operating lever 21*a* and the right operating lever 21*b* can be tilted and operated in diagonal directions; e.g., when the left operating lever 21*a* is tilted forward and to the right, the revolving body 11 turns to the right, and the arm 27 flexes upward.

To summarize, the controller 90 for controlling all the operations of the power shovel device 20, provided within the revolving body 11, receives operating signals that are outputted from the operating device 21 when the operating device 21 is operated, and outputs control signals to the hydraulic control valves 80, as shown in FIG. 2. The hydraulic control valves 80 control the feeding of hydraulic fluid to the boom cylinder 31 and other components on the basis of the control signals from the controller 90. When control signals are outputted from the controller 90, the hydraulic control valves 80 control the feeding of hydraulic fluid that is discharged from the hydraulic pump 14 drivable by the drive power of the electric motor 13 provided to the revolving body 11, drives the revolving motor 37 to turn the revolving body 11, drives the boom cylinder 31 to raise and lower the boom 25, drives the arm cylinder 33 to flex and extend the arm 27, and drives the bucket cylinder 35 to operate the bucket 29.

As is apparent from this summary, the hydraulic control valves 80 has the revolution control valve 87 that corresponds to the revolving motor 37 for turning the revolving body 11; the boom control valve 81 that corresponds to the boom cylinder 31 for raising and lowering the boom 25; the arm control valve 83 that corresponds to the arm cylinder 33 for flexing and extending the arm 27; and the bucket control valve 85 that corresponds to the bucket cylinder 35 for operating the bucket 29. Feeding of the hydraulic fluid flowing to the boom cylinder 31 and other components is controlled by controlling the degree of valve opening of the boom control valve 81, the arm control valve 83, the bucket control valve 85, and the revolution control valve 87 in the hydraulic control valves 80. The boom 25 is raised and lowered by the extension and retraction of the boom cylinder 31, the arm 27 is flexed and extended by the extension and retraction of the arm cylinder 33, and the bucket 29 scoops and empties through the extension and retraction of the bucket cylinder 35. When a control signal is outputted from the controller 90 to the motor variable-speed control device 115, the speed of the electric motor 13 is thereby varied and controlled so that the electric motor 13 outputs the appropriate torque.

Figure 3:
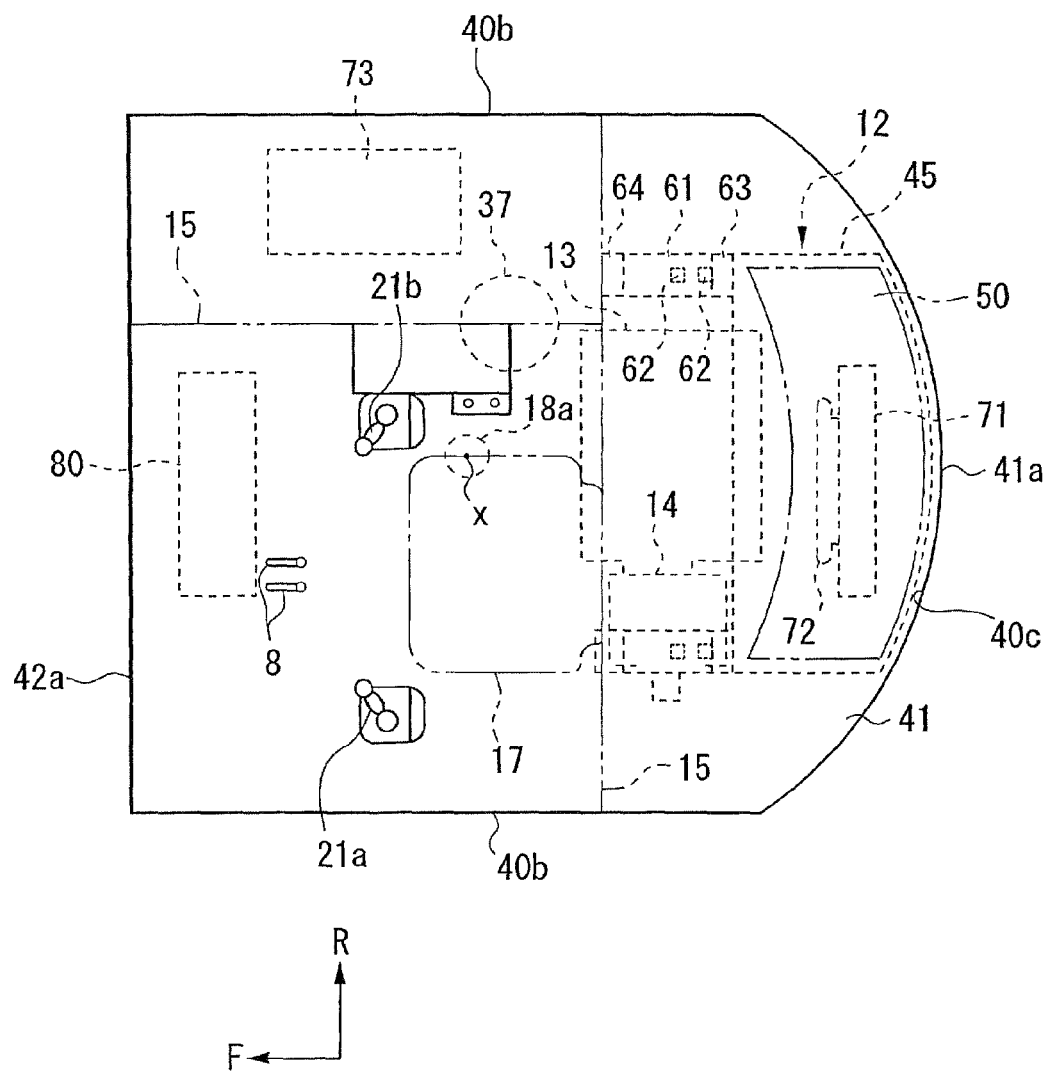
FIG. 3 is a plan view showing the revolving body provided to the industrial vehicle according to Example 1.
Figure 4:
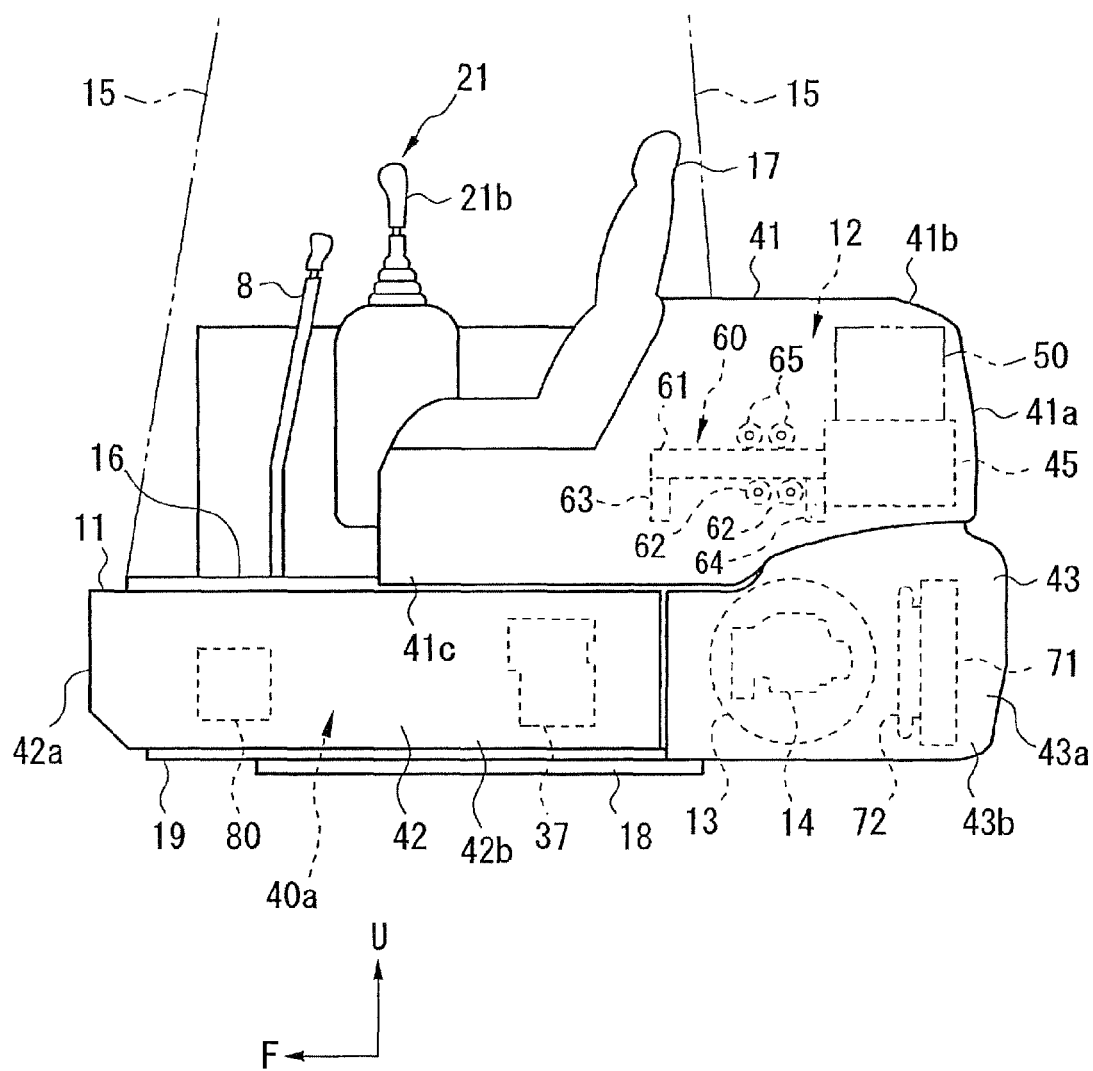
FIG. 4 is a side view showing the revolving body provided to the industrial vehicle according to Example 1.

An example of the structure of the revolving body 11 and the arrangement of the various devices provided therein will next be described. As shown in FIGS. 3 and 4, the revolving body 11 has a main body base plate 19 and a cover 40. The devices constituting the power shovel industrial vehicle 1 are disposed on the main body base plate 19, and these various constituent devices are housed in an internal space 40*a* formed inside the cover 40. The cover 40 is composed of a main cover 41, a side cover 42, and a lower cover 43.

The side cover 42 is composed of a front surface 42*a* that extends upward from the edge of the front end of the main body base plate 19 to the bottom surface of the operator cabin 15, and covers the lower front part of the operator cabin 15; and a pair of left and right side surfaces 42*b* that extend to the rear from the left and right edges of the front surface 42*a* and cover the left and right lower parts at the front of the operator cabin 15.

The lower cover 43 extends to the rear continuously from the edges of the rear ends of the side surfaces 42*b* of the side cover 42, and is composed of a pair of left and right side surfaces 43*b* for covering the left and right lower parts at the rear of the operator cabin 15; and a rear surface 43*a* for connecting the pair of left and right side surfaces 43*b* and covering the lower rear part of the operator cabin 15.

The main cover 41 is composed of an upper surface 41b extending to the rear from the center of the back surface of the operator seat 17; a pair of left and right side surfaces 41c formed so as to fold downward from the upper surface 41b that extend to the front and rear above the side surfaces 42b, 43b of the side cover 42 and the lower cover 43; and a rear surface 41a for connecting the upper surface 41b and the pair of left and right side surfaces 41c and covering the rear of the operator seat 17. The rear surface 41a of the main cover 41 is formed in a curved shape.

The rear of the operator seat 17 (rear upper part of the revolving body 11) is thus covered by the main cover 41, the lower part of the front of the operator seat 17 (front lower part of the revolving body 11) is covered by the side cover 42, and the lower part of the rear of the operator seat 17 (rear lower part of the revolving body 11) is covered by the lower cover 43. As shown in FIG. 4, the external shape as viewed in a plane of the revolving body 11 in which the covers 40 are provided on the periphery is substantially U shaped, in which the left and right side surfaces 40b, 40b formed by the side surfaces 41b, 42b, 43b of the covers extends forward and backward in linear fashion, and the rear end surface 40c formed by the rear surface 41a of the main cover 41 extends in curved fashion. Since the rear end surface 40c is curved in this manner, the turning radius is compact, and enhancement of working properties can be anticipated.

The main body base plate 19 is supported so as to be able to turn horizontally about an axis of revolution X that extends vertically via a revolution bearing 18 at the top of the undercarriage 7. A rotary joint 18a supported by the undercarriage 7 is disposed in the center part of the revolution bearing 18. The hydraulic control valves 80 are disposed inside the side cover 42. Hydraulic fluid can be fed from the hydraulic control valves 80 through a rotary joint 18a to the hydraulic motor for driving the crawler tracks 3, 3.

A battery storage part 12 is provided partway (towards the center) in the left-right direction of the rear end part of the revolving body 11, and a battery 50 is disposed in the battery storage part 12 so as to extend in the left-right direction. The battery storage part 12 is covered by the main cover 41 as described above. The battery 50 is a high-capacity rechargeable lithium ion battery or organic radical battery, and can be withdrawn and inserted in the front-rear direction with respect to the revolving body 11 through the use of a slide mechanism 60 described hereinafter. Since the battery 50 is positioned in the center in the left-right direction of the rear end part of the revolving body 11, the weight of the implement attached to the front part of the revolving body 11 can be balanced, and the battery 50 as such acts as a counterweight.

In the case of organic radical batteries, an organic radical material, which is a type of thermoplastic resin, is used as the positive electrode material. Characteristics of organic radical batteries are higher capacity than lithium ion batteries, high electrochemical reaction rate, and short charging time. Organic radical batteries also differ from lithium ion batteries in that heavy metal oxides such as lithium cobalt oxide or lithium manganese oxide are not used as electrodes, and organic radical batteries are also lighter and have less effect on the environment.

A high-capacity capacitor may also be used instead of a battery 50 as the source of electric power fed to the electric motor 13. Alternatively, a secondary battery system having a composite structure in which a battery 50 and a high-capacity capacitor are combined may also be used by connecting a battery 50 and a high-capacity capacitor in parallel. A composite configuration of a battery 50 and a high-capacity capacitor makes it possible to reduce voltage drops due to sudden overload. This is an effective means when the battery capacity of the lithium ion battery or the organic radical battery is reduced.

An oil cooler 71 having a radiator for cooling the hydraulic fluid for operating the boom cylinder 31 and other components is disposed below the battery 50. A cooling fan 72 that operates through the use of an electric motor (not shown) for driving the cooling fan that receives electrical power from the battery 50 is provided on the back side of the oil cooler 71, and the cooling fan 72 blows cool air toward the radiator of the oil cooler 71, thereby aiding in heat exchange with the hydraulic fluid in the radiator of the oil cooler 71.

The electric motor 13 driven by electric power fed from the battery 50 is disposed in front of the oil cooler 71 in a left-right orientation (so that the longitudinal direction of the motor shaft coincides with the left-right direction of the revolving body 11), and the hydraulic pump 14, which is driven by the electric motor 13 and feeds hydraulic fluid for operating the revolving motor 37, the boom cylinder 31, the arm cylinder 33, the bucket cylinder 35, and other hydraulic devices, is attached to the left side of the electric motor 13. The electric motor 13, the hydraulic pump 14, and the oil cooler 71 are all disposed in the space covered by the lower cover 43.

The oil tank 73 for storing the hydraulic fluid for operating the hydraulic devices is disposed in the lower part (lower than the floor panel 16 in the operator cabin 15) in the revolving body 11 and on the right side, and the hydraulic control valves 80 composed of the revolving drive control valve 87 and other valves described above are provided to the front end part at the bottom inside the revolving body 11. The revolving motor 37 is disposed in the lower part of the revolving body 11 and diagonally downward and to the right of the operator seat 17.

As described above, in the present example, the hydraulic control valves 80, the oil tank 73, the revolving motor 37, the electric motor 13 and hydraulic pump 14, and the oil cooler 71 are arranged in sequence in a plane from the front end of the revolving body 11 to the rear end thereof. Among these components, the hydraulic control valves 80, the oil tank 73, and the revolving motor 37 are covered by the side cover 42, and the electric motor 13, the hydraulic pump 14, and the oil cooler 71 are covered by the lower cover 43.

Figure 5:
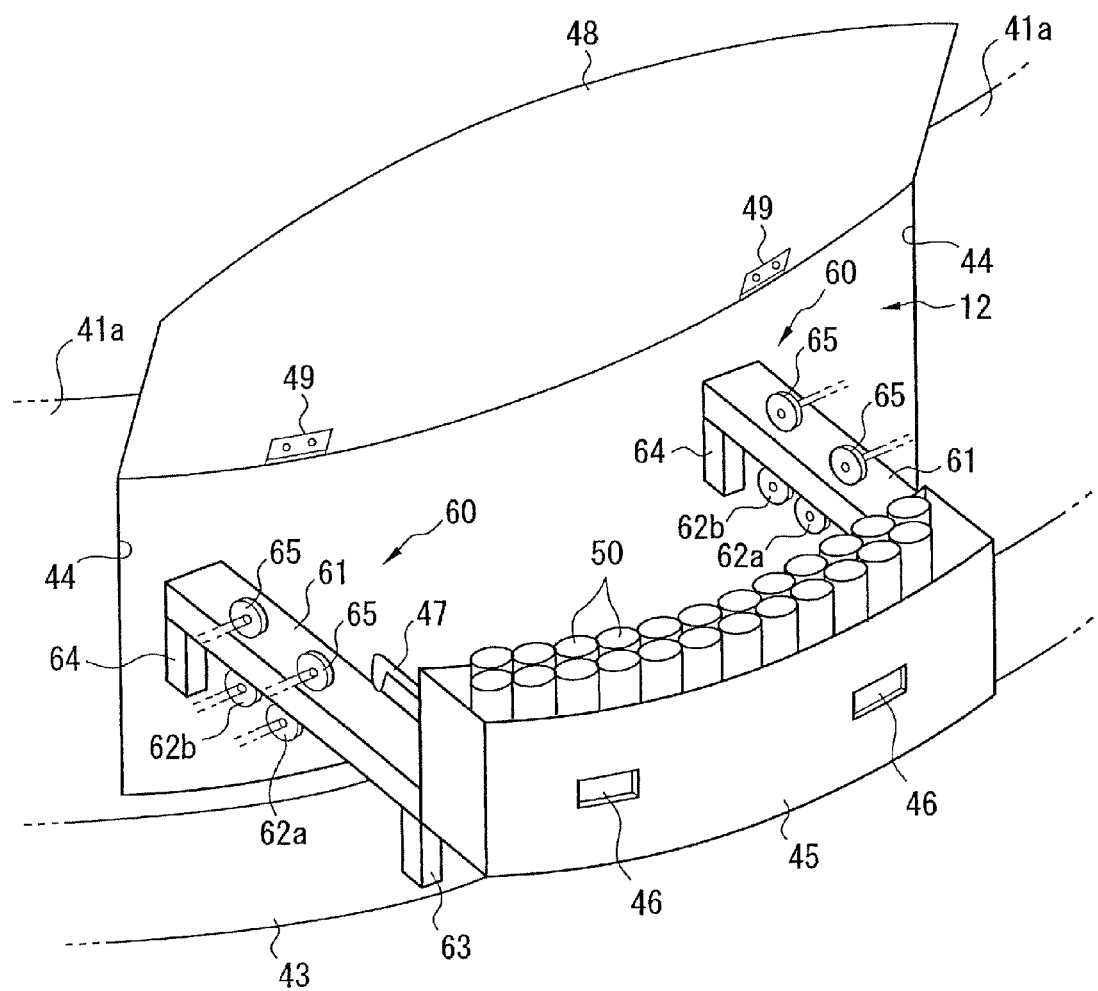
FIG. 5 is a perspective view showing the area around the battery storage part for storing the battery that is provided to the industrial vehicle according to Example 1.

As shown in FIG. 5, a battery storage opening 44 is formed in the curved surface 41a constituting the rear end part of the revolving body 11. The battery storage opening 44 can be opened by swinging up a storage lid 48 that can be pivoted up and down and constitutes a portion of the curved surface 41a, through the use of hinges 49, 49 arranged on the left and right on the upper open end of the battery storage opening 44 (a configuration may also be adopted in which a hinge 49 is provided to the open end at the bottom of the battery storage opening 44, and the storage lid 48 is pivoted downward). A battery 50 can be taken out of or stored in the battery storage part 12 covered by the upper cover 41 by taking out or placing the battery 50 in the front-rear direction via the battery storage opening 44 in a state in which the battery storage opening 44 is opened.

A box-shaped drawer part 45 opening upward for accommodating the battery 50, and a slide mechanism 60 for moving the box-shaped drawer part 45 forward and backward are provided in the battery storage part 12 in order to remove and store the battery 50.

The box-shaped drawer part 45 has a structure in which the front and rear surfaces are substantially arcuate curved surfaces so as to conform to the shape of the curved surface 41a. The rear surface has a pair of left and right handles 46, 46 formed therein that can be grasped by the operator. A plurality of cylindrical batteries 50, 50, . . . (plurality of cells) is arranged upright in two rows, front and rear, and accommodated in the drawer part 45. Hook-shaped lock levers 47, 47 that can engage with lever locking parts (not shown) provided to the battery storage part 12 are attached to the left and right ends of the front surface of the drawer part 45 so as to extend in the front-rear direction. The lock levers 47 can be engaged and released so as to move in conjunction with a releasing operation of a lock release part (not shown) provided to the handles 46.

As described above, the front and rear surfaces of the drawer part 45 are curved surfaces that conform to the shape of the curved surface 41a of the rear end of the revolving body 11, but when numerous batteries 50 having a small diameter are accommodated in the drawer part 45 (numerous cells are accommodated), the batteries 50 can be densely accommodated inside the drawer part 45 in accordance with the curvature of the front and rear surfaces of the drawer part 45 regardless of the curvature. Since the batteries 50 are lithium ion batteries, and have a smaller volume than the lead batteries conventionally used as vehicle batteries, the amount of space occupied by the batteries can be reduced, and a commensurately larger space can be maintained for such devices as the hydraulic pump or the electric motor. Lithium ion batteries have the further advantages of lighter weight than lead batteries, easy replacement, and short charging time.

The slide mechanism 60 for allowing the box-shaped drawer part 45 for accommodating the batteries 50 to move forward and backward has a structure such as the one described below. As shown in FIG. 5, the slide mechanism 60 has a pair of beam-shaped rails 61, 61 extending substantially horizontally forward and backward and attached to the left and right ends on the back surface side of the drawer part 45; a pair of rollers 62a, 62b for rotating in the front-rear direction while in contact with the lower surfaces of the rails 61, 61 about shafts that are attached inside the revolving body 11 with the left-right direction as the longitudinal axis direction thereof rollers 65, 65, . . . for rotating in the front-rear direction while in contact with the upper surfaces of the rails 61, 61; front stoppers 63, 63 provided to the front end parts of the rails 61, 61 so as to extend vertically; and rear stoppers 64, 64 provided to the rear end parts of the rails 61, 61 so as to extend vertically.

A case will be described in which maintenance is performed for the batteries 50 stored in a battery storage part 12 having a configuration such as the one described above. Battery maintenance refers to replacement, inspection, and the like of the batteries 50. To service the batteries 50, the operator grasps the handles 46 provided to the drawer part 45 and releases the lock levers 47 through the use of the abovementioned lock release part in a state in which the storage lid 48 is opened and pivoted upward, and the operator pulls the drawer part 45 forward until the front surfaces of the rear stoppers 64 come in contact with the rollers 62b. At this time, the batteries 50 are exposed from the battery storage part 12, and the batteries 50 can therefore be replaced. Since the rails 61, 61 are both held between the lower rollers 62a, 62b and the upper rollers 65, 65, the drawer part 45 that is pulled out by the operator pulling the handles 46 does not drop out from the revolving body 11.

After replacement of the batteries 50 is completed, the drawer part 45 is pushed into the battery storage part 12 until the back surfaces of the front stoppers 63 make contact with the rollers 62a while the handles 46 are grasped. The drawer part 45 is closed and locked from sliding out by the rollers 62a making contact with the front stoppers 63, and by the engaging of the hook-shaped lock levers 47 with the lever locking part (not shown). The sequence of maintenance operations is completed by pivoting the storage lid 48 downward and closing the battery storage opening 44, and a transition to excavation work or the like can then be made.

In the above description, a plurality of cylindrical battery cells 50, 50, . . . (plurality of cells) are arranged upright in two rows, front and rear, and accommodated in the drawer part 45, but a configuration may also be adopted in which battery cells 51 through 53 such as those shown in FIG. 6 are arranged instead of cylindrical battery cells 50. These cells 51 through 53 are formed by sealing an electrolyte solution 55 inside thin-profile aluminum packages 51a through 53a as shown in FIG. 6, and molding the cells into flat plates. The surface area and thickness (height) of each cell 51 through 53 as viewed in a plane are set so as to be equal, and each cell 51 through 53 has an equal electrical capacity in terms of having the same amount of electrolyte solution sealed therein. Specifically, FIGS. 6A through 6C show the planar shapes of the battery cells 51 through 53, and the cells are formed in rectangular shapes having equal surface areas, and the cells also have equal thickness and height.

Figure 7:
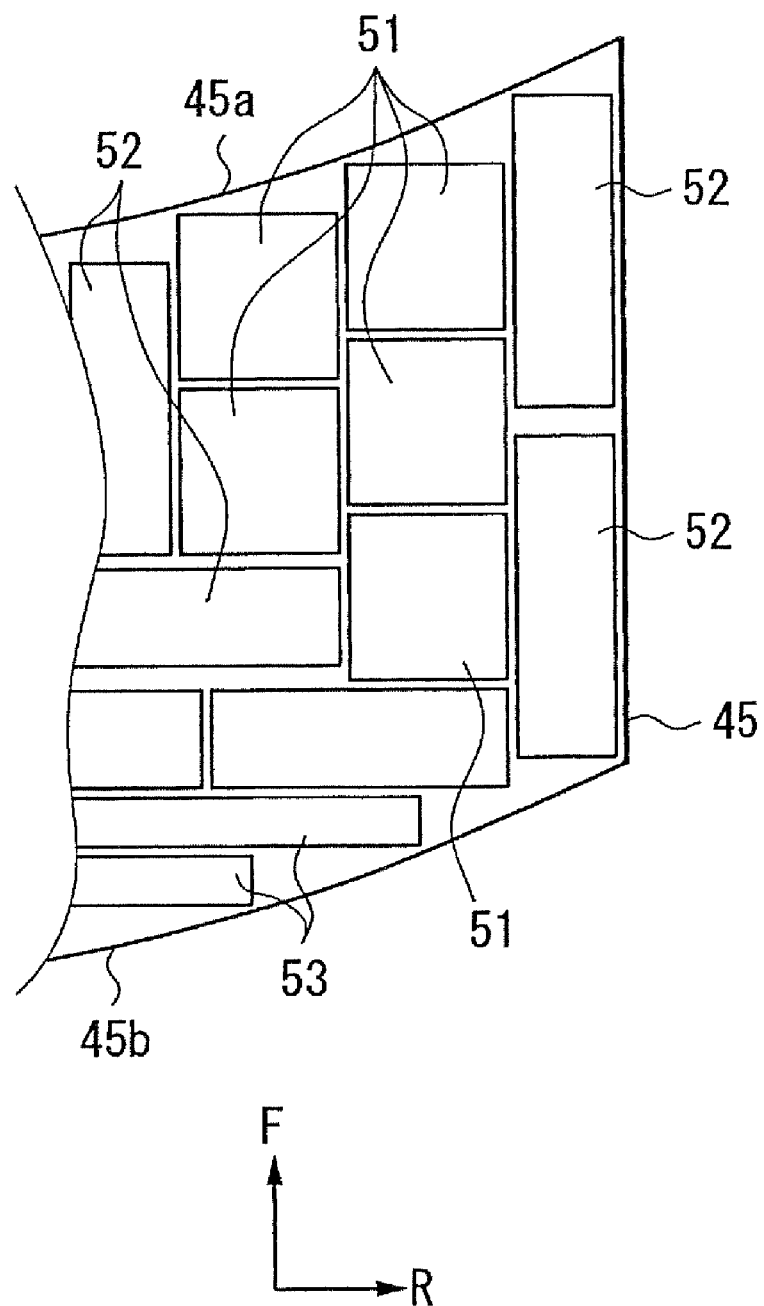
FIG. 7 is a schematic view showing an example in which the battery cells shown in FIG. 6 are disposed in a drawer part.

As shown in FIG. 7, the plurality of battery cells 51 through 53 is densely arranged the in the front-rear and left-right directions within the drawer part 45, and is arranged in a vertical stack to form a battery. The arrangement of the battery cells 51 through 53 is thus designed as a dense arrangement to efficiently utilize the space inside the drawer part 45. The planar shapes of the battery cells are not limited to the three shapes shown in FIG. 6, and curved shapes may also be formed. The manner in which the battery cells are arranged inside the drawer part 45 is also not limited to the example shown in FIG. 7, and the arrangement may be changed as appropriate.

During charging of the battery composed of the cells 51 through 53, since the electrical capacities of the cells 51 through 53 are set so as to be equal, there is no unevenness of charging between battery cells, and the cells can be uniformly charged.

A configuration is also adopted in which cells having the same planar shape are vertically stacked, but there may be any number of stacked cells 51. Since the cells 51 are formed in a thin-profile flat plate shape, the cells are stacked vertically to form three-dimensional parts, and degree of freedom in setting the height of the battery 50 therefore increases. It is also not necessarily required that the same number of cells be stacked with respect to the cells arranged along the lower wall surface 45c. Furthermore, the cells may also be merely aligned in the front-rear and left-right directions without being vertically stacked, according to the required electrical capacity and the amount of surface area allowed by the battery arrangement. In any of these cases, the battery can be molded into a complex shape, and the battery can be compactly molded.

Example 2

Figure 8:
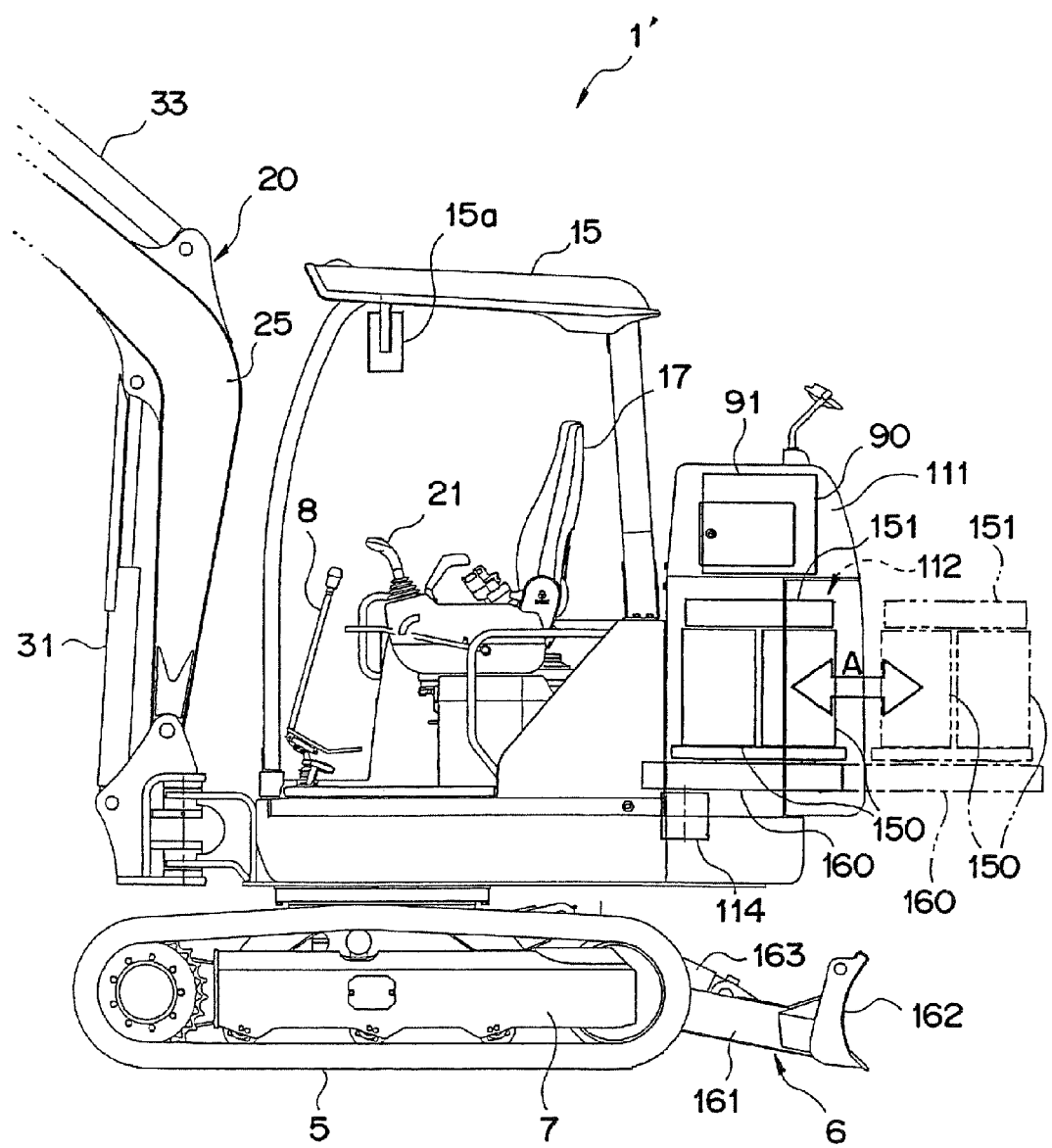
FIG. 8 is a left side view showing the industrial vehicle of Example 2, in which the arrangement structure of the devices differs from that of the industrial vehicle of Example 1.
Figure 9:
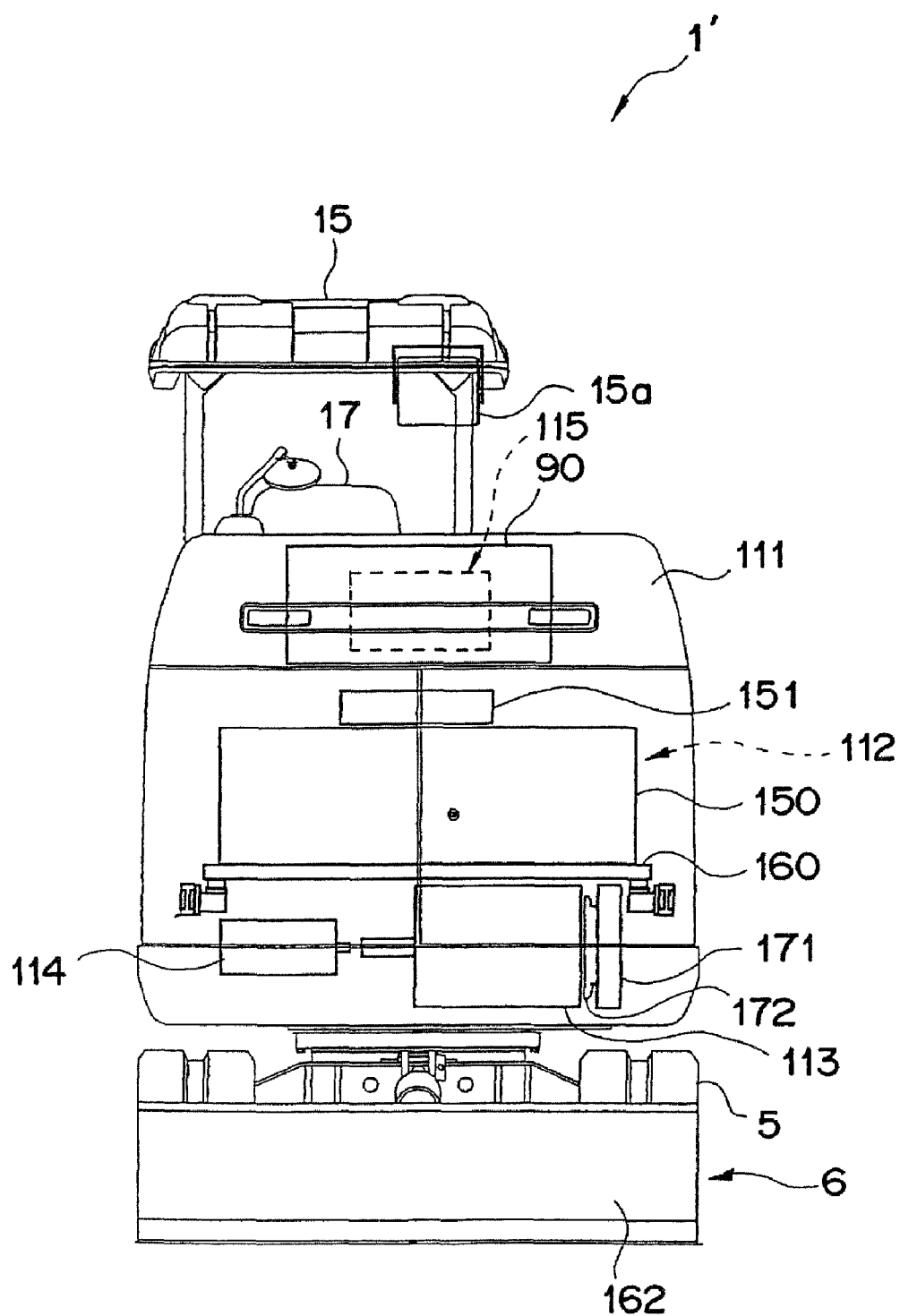
FIG. 9 is a back view showing the industrial vehicle according to Example 2.
Figure 10:
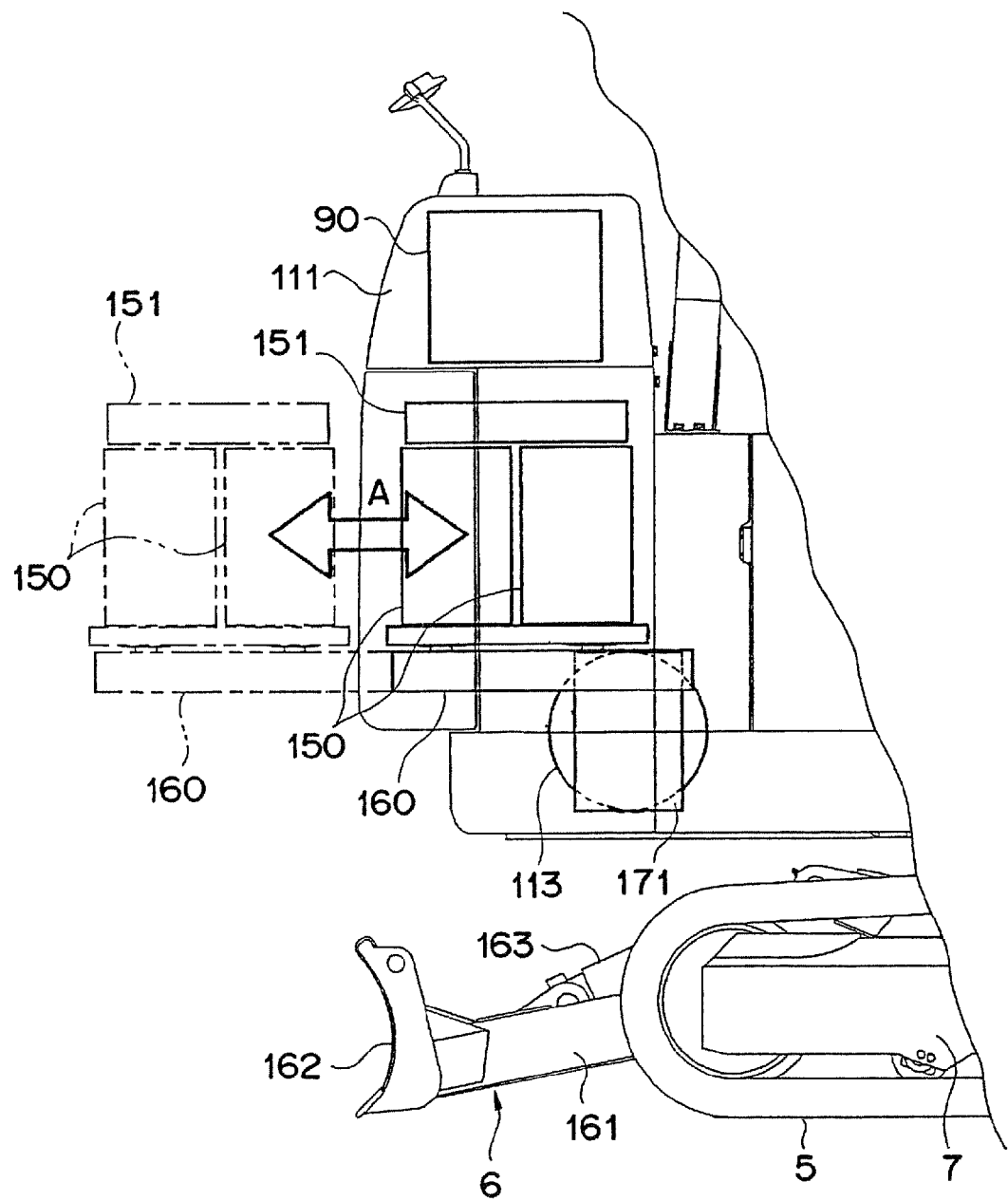
FIG. 10 is a right side view showing a portion of the industrial vehicle according to Example 2.

A second example of the power shovel industrial vehicle as the electrically driven industrial vehicle of the present invention will next be described using FIGS. 8 through 10 in particular, with emphasis on the portions that differ from the first example. As shown in FIGS. 8 through 10, the power shovel industrial vehicle 1' in the present example differs from the first example with respect to the arrangement configuration (particularly the oil cooler 171) of devices within the revolving body 11. The same reference symbols are therefore used to indicate components that are the same as those of Example 1.

The power shovel industrial vehicle 1' has the undercarriage 7 provided with the travel device 5; a revolving body 111 forming a vehicle body frame in which batteries 150 are installed; the power shovel device 20; a loader 6; and the operator cabin 15. The boom 25 can be hoisted by the boom cylinder 31, an arm (not shown) attached to the distal end of the boom 25 can be flexed and extended by the arm cylinder 33, and a bucket (not shown) attached to the distal end of the arm can be pivoted up and down by a bucket cylinder.

The operator seat 17 is provided in the operator cabin 15. The operating device 21 and the pair of travel operating levers 8, 8 are disposed in the operator cabin 15. A display 15a visible to the working operator who is seated in the operator seat 17 is provided to the ceiling part in the operator cabin 15, and the operator can work while checking the status (whether charging is needed) of the batteries 150.

The front loader 6 has left and right booms 161, 161 whose proximal ends are pivotally connected to the undercarriage 7 so as to be able to rotate about an axis in the left-right direction, and a bucket 162 pivotally connected to the distal ends of the left and right booms 161, 161 so as to be able to rotate about an axis in the left-right direction. The booms 161 are pivoted up and down by the extension and retraction of a boom cylinder 163 situated between the undercarriage 7 and the booms 161, and the bucket 162 is pivoted up and down by the extension and retraction of a bucket cylinder (not shown) situated between the booms 161 and the bucket 162.

A battery storage part 112 is provided partway (towards the center) in the left-right direction of the rear end part of the revolving body 111, and a pair of batteries 150, 150 arranged in the front-rear direction are disposed in the battery storage part 112 so as to extend in the left-right direction. The batteries 150 are high-capacity rechargeable lithium ion batteries or organic radical batteries, the same as in Example 1, and can be withdrawn and inserted in the front-rear direction (direction of arrow A) with respect to the revolving body 111 through the use of a slide mechanism 160. As described in Example 1 above, a plurality of cylindrical batteries is arranged upright in the batteries 150. Since the batteries 150 are positioned in the center in the left-right direction of the rear end part of the revolving body 111, the weight of the implement attached to the front part of the revolving body 111 can be balanced. The batteries 150 as such therefore act as counterweights.

The controller 90 for controlling the overall operation of the power shovel device 20 is provided above the batteries 150 at the rear end of the revolving body 111. This controller 90 receives operating signals based on the operation of the operating device 21, and outputs control signals to the hydraulic control valves 80. The hydraulic control valves 80 control the feeding of hydraulic fluid to the boom cylinder 31 and other components on the basis of the control signals from the controller 90, and can perform such operations as causing the boom 25 to be raised and lowered. A door 91 that can be opened and closed is provided to the top part of the rear end of the revolving body 111, and by opening the door 91, the controller 90 provided inside the revolving body 111 can be serviced and various settings can be changed. The motor variable-speed control device 115 for receiving control signals outputted from the controller 90 and varying and controlling the speed of the electric motor 13 so that the electric motor 13 outputs the appropriate torque is provided in the vicinity of the controller 90. A battery charge/discharge controller 151 electrically connected to the controller 90 is provided above the batteries 150, the control signals from the controller 90 can be received, and the charging and discharging of the battery 50 can be controlled.

An electric motor 113 driven by electric power fed from the batteries 150 is disposed in below the batteries 150 in a left-right orientation (so that the longitudinal direction of the motor shaft coincides with the left-right direction of the revolving body 111), and a hydraulic pump 114, which is driven by the electric motor 113 and feeds hydraulic fluid for operating the boom cylinder 31 and other hydraulic devices, is attached to the left side of the electric motor 113 and below the batteries 150.

An oil cooler 171 capable of recirculating the hydraulic fluid that has a radiator for cooling the hydraulic fluid for operating the boom cylinder 31 and other components is disposed on the right side (right side of the electric motor 113) inside the revolving body 111 and below the batteries 150. The oil cooler 171 is disposed so as to extend in the front-rear direction of the revolving body 111, and the radiator is oriented in the left-right direction of the revolving body 111. A cooling fan 172 that operates through the use of an electric motor (not shown) for driving the cooling fan that receives electrical power from the batteries 150 is provided on the back side of the oil cooler 171 (between the oil cooler 171 and the electric motor 113), and the cooling fan 172 blows cool air toward the radiator of the oil cooler 171, thereby aiding in heat exchange with the hydraulic fluid in the radiator of the oil cooler 171.

In the present example as described above, the controller 90 is disposed at the top in the rear end part inside the revolving body 111, the batteries 150 are disposed below the controller 90, and the hydraulic pump 114, the electric motor 113, and the oil cooler 171 are arranged in sequence in a plane from the left side of the revolving body 111 to the right side thereof below the batteries 150. The batteries 150 are not necessarily limited to being arranged inside the revolving body 111 and at the rear end of the revolving body 111, and the batteries 150 may also be disposed inside the revolving body 111 on both the left and right sides of the front end part of the revolving body 111 insofar as there is no interference with the electric motor 113, the hydraulic pump 114, or other devices.

Figure 11:
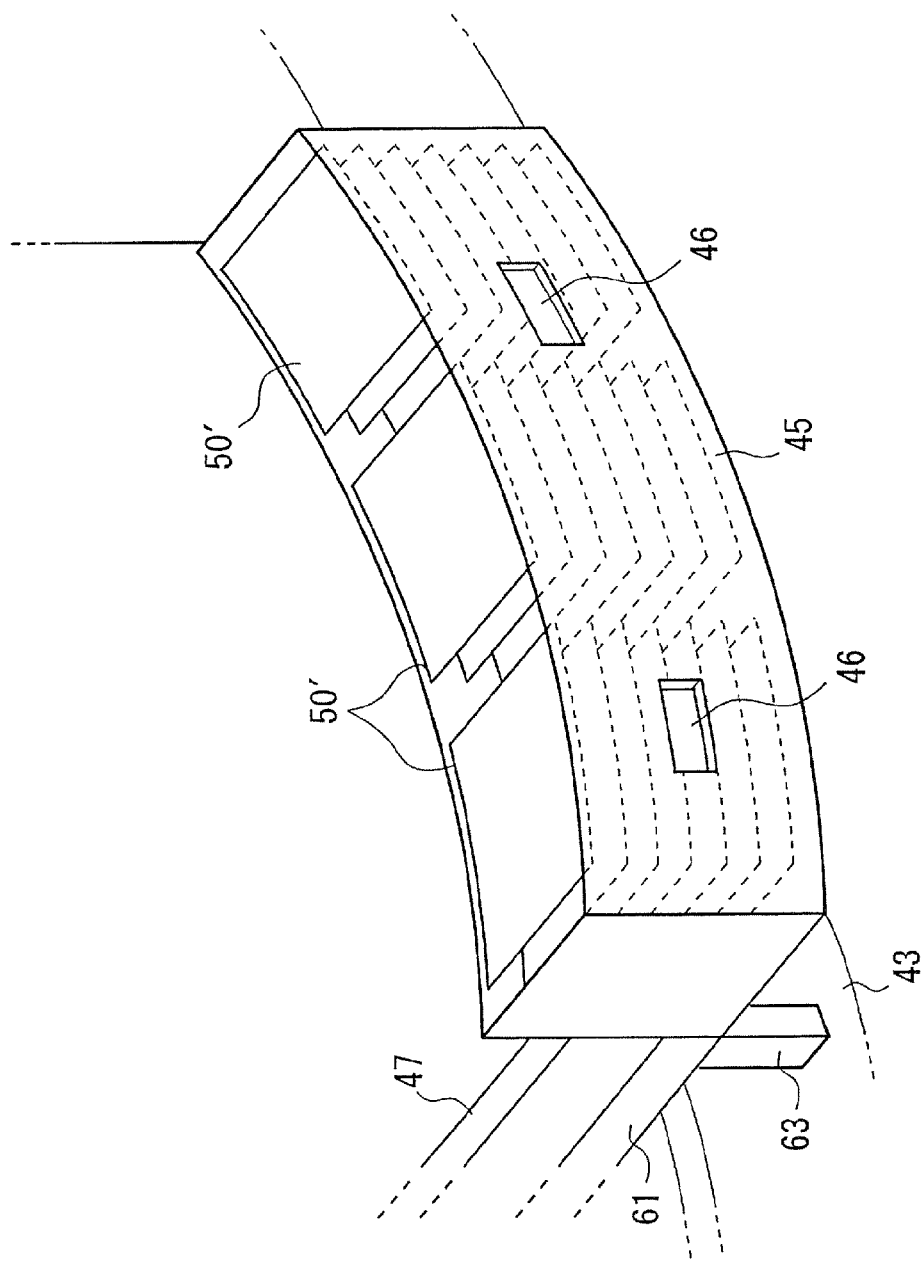
FIG. 11 is a perspective view showing an example of a different structure of the battery cells, and shows the area around the battery storage part in a state in which a plurality of battery cells is accommodated in a vertically stacked arrangement.
Figure 12:
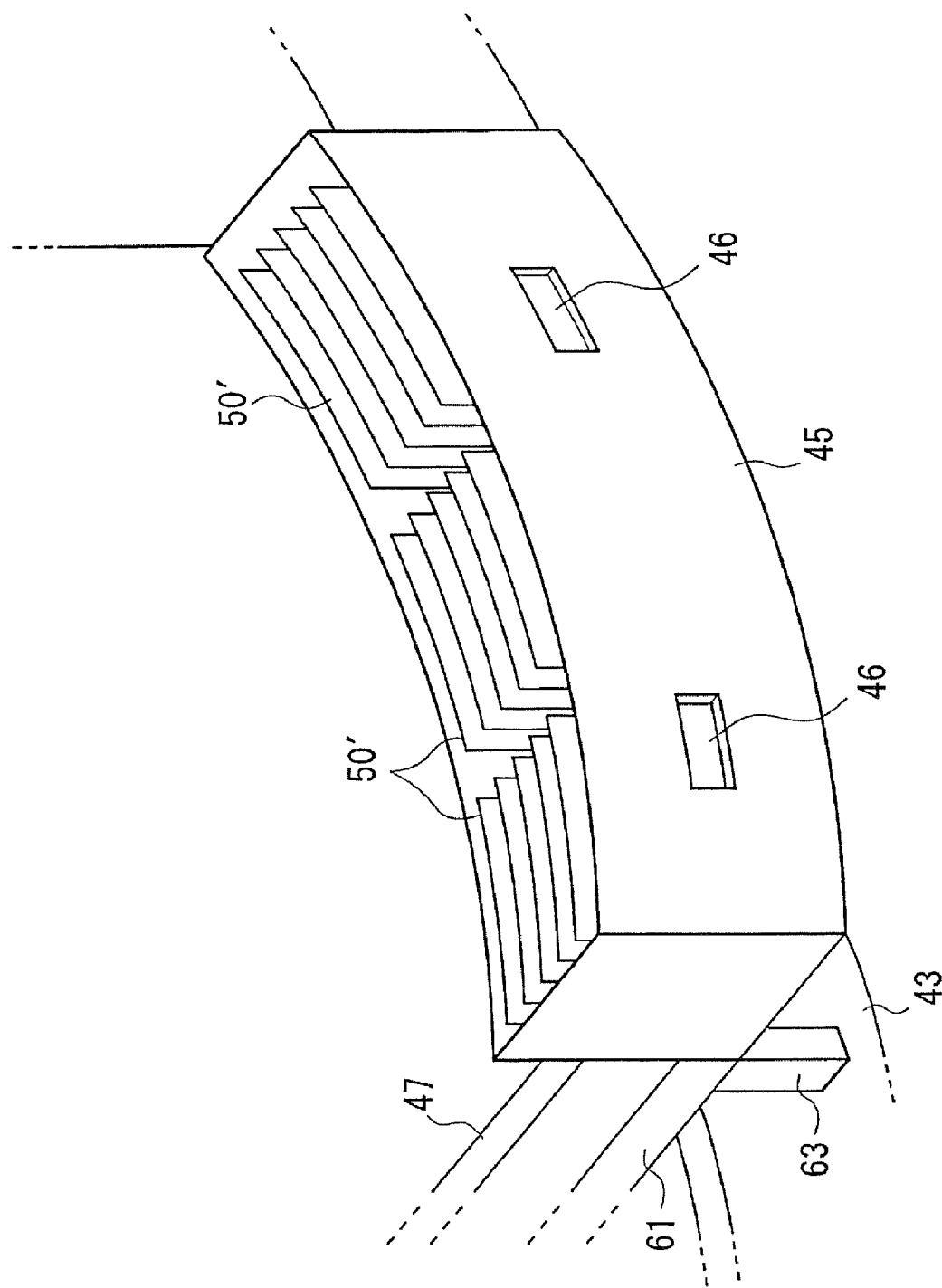
FIG. 12 is a perspective view showing an example of another different structure of the battery cells, and shows the area around the battery storage part in a state in which a plurality of battery cells is accommodated in a front-to-rear alignment.
Figure 13:
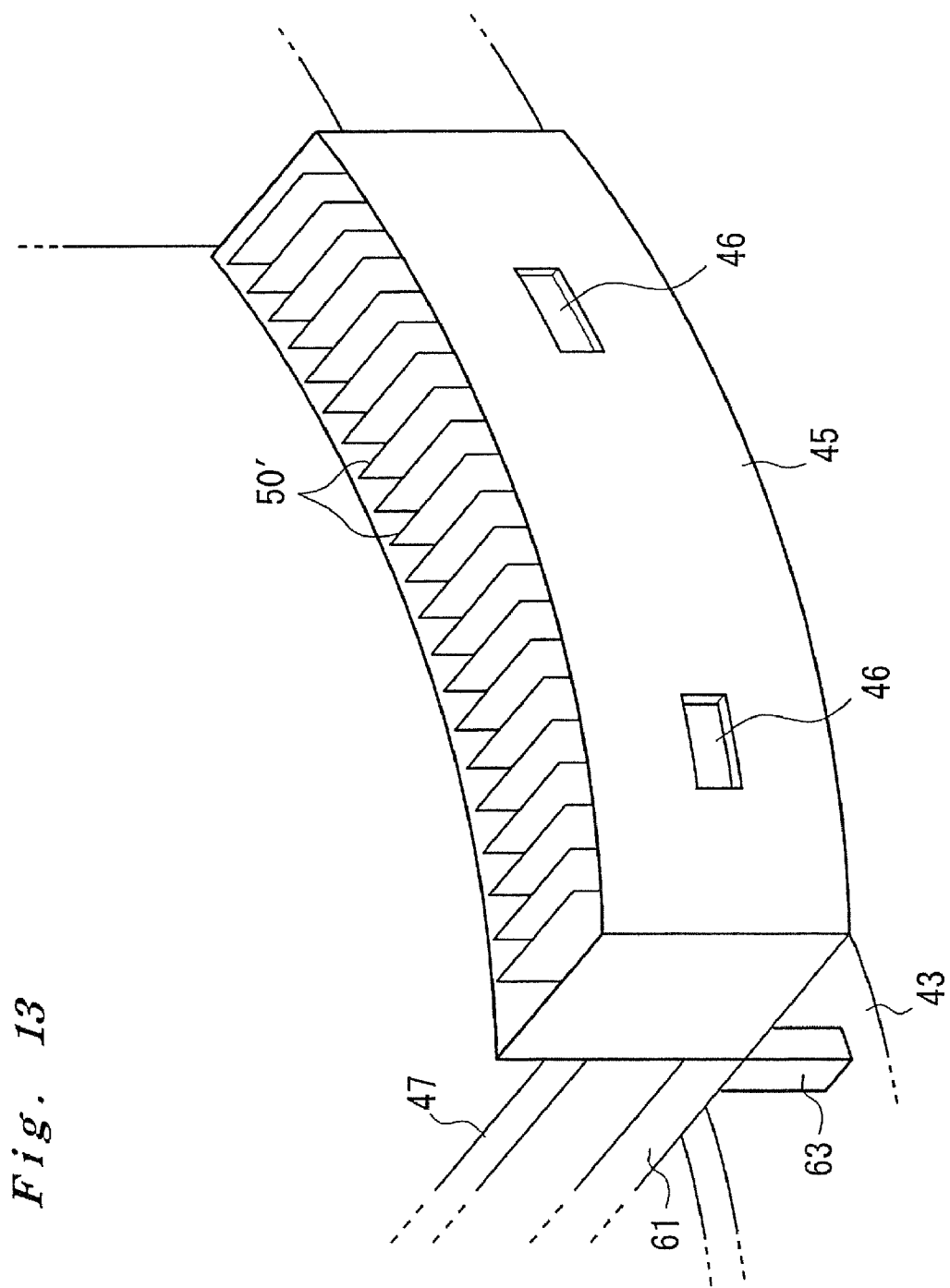
FIG. 13 is a perspective view showing an example of a different structure of the battery cells, and shows the area around the battery storage part in a state in which a plurality of battery cells is accommodated in a left-to-right alignment in a drawer part.

In the example described above, the battery 50 is composed of substantially cylindrical cells arranged upright, but this configuration is not limiting, and a configuration such as the following may be adopted. FIG. 11 shows batteries 50' in place of the substantially cylindrical batteries 50. The batteries 50' are composed of pouch-shaped cells in which an electrolyte solution is sealed, and numerous pouch-shaped batteries 50' are vertically stacked and accommodated in the drawer part 45. The drawer part 45 is configured so that the front and rear surfaces thereof are curved and conform to the shape of the rear end part of the revolving body 11, but because the batteries 50' are flexible, numerous batteries 50' can be densely accommodated within the drawer part 45 regardless of the curvature of the front and rear surfaces of the drawer part 45 by curving each of the batteries 50' to the same curvature. Such pouch-shaped batteries 50' may be arranged front to back and accommodated in the drawer part 45 as shown in FIG. 12, or the batteries 50' may be arranged left to right and accommodated in the drawer part 45.

Example 3

Figure 14:
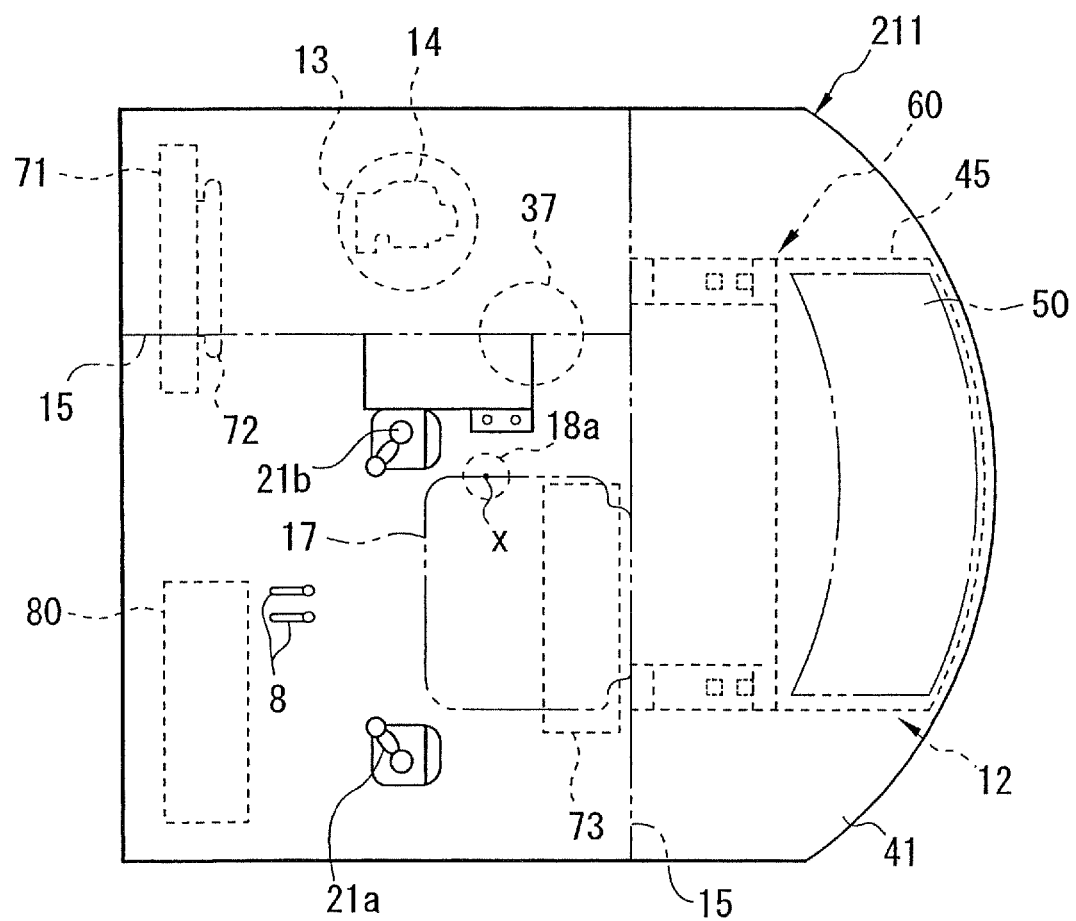
FIG. 14 is a plan view showing the revolving body provided to the industrial vehicle according to Example 3.
Figure 15:
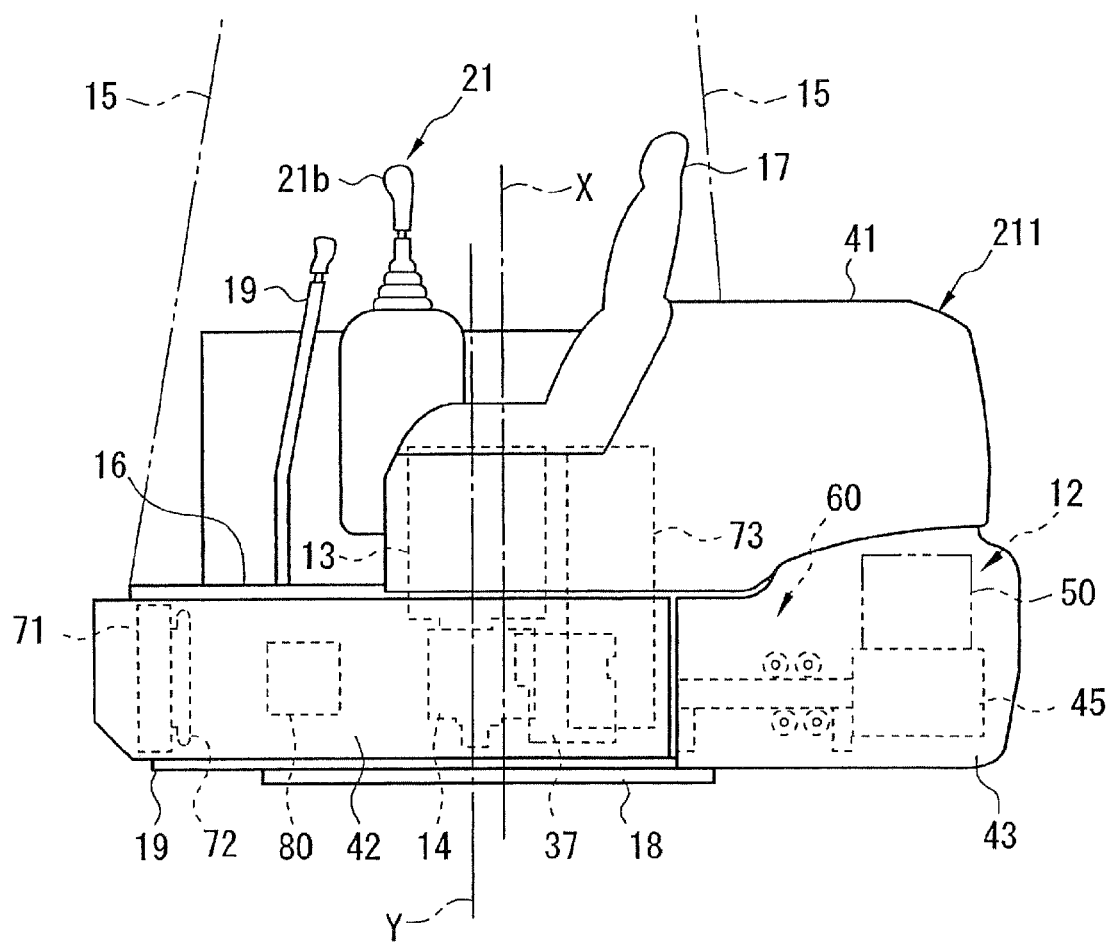
FIG. 15 is a side view showing the revolving body provided to the industrial vehicle according to Example 3.

A third example of the power shovel industrial vehicle as the electrically driven industrial vehicle of the present invention will next be described using FIGS. 14 and 15, with emphasis on the portions that differ from Example 1 and Example 2. As shown in FIGS. 14 and 15, the power shovel industrial vehicle in the present embodiment differs from Example 1 and Example 2 with respect to the arrangement configuration of devices within the revolving body 211, but other aspects are the same as in the previous examples. Portions other than the internal configuration of the revolving body will therefore not be described. The same reference symbols are used to indicate internal components of the revolving body that are the same as those of Example 1 and Example 2.

As shown in FIGS. 14 and 15, the revolving body 211 is composed of the base plate 19, the main cover 41, the side cover 42, and the lower cover 43, and the devices disposed on the base plate 19 are covered by the main cover 41 and other covers. The revolving body 211 has a substantially U-shaped shape as viewed in a plane, and is supported on the undercarriage 7 of the travel device 5 so as to be able to turn about the axis of revolution X via the revolution bearing 18.

The battery storage part 12 is provided partway (towards the center) in the left-right direction of the rear end part in the lower part inside the revolving body 211, and a battery 50 is disposed in the battery storage part 12 so as to extend in the left-right direction. The battery storage part 12 is covered by the lower cover 43 as described above. The battery 50 is a lithium ion battery, and can be withdrawn and inserted in the front-rear direction with respect to the revolving body 211 through the use of the slide mechanism 60. Since the battery 50 is positioned in the center in the left-right direction of the rear end part of the revolving body 211, the weight of the implement (boom 25 and other components) attached to the front part of the revolving body can be balanced, and the battery 50 as such acts as a counterweight.

The electric motor 13 driven by a supply of electric power from the battery 50 is disposed in a so-called upright position at the right-side end inside the revolving body 211 so that the axis direction (indicated by the axis Y in FIG. 4) of the rotary shaft of the electric motor 13 substantially coincides with the direction of the axis of revolution X of the revolving body 211. Furthermore, the hydraulic pump 14, which is driven by the electric motor 13 and feeds hydraulic fluid for operating the revolving motor 37, the boom cylinder 31, the arm cylinder 33, the bucket cylinder 35, and other hydraulic devices, is disposed below the electric motor 13. Specifically, the electric motor 13 and the hydraulic pump 14 are arranged within the revolving body 211 vertically in the direction of the axis of revolution X of the revolving body 211.

The configuration in which the hydraulic pump 14 is disposed below the electric motor 13 is not limiting, and because it is sufficient for the electric motor 13 and the hydraulic pump 14 to be disposed so that the axis direction of the rotary shaft of the electric motor 13 is aligned with the direction of the rotation axis X of the revolving body 211, the hydraulic pump 14 may be disposed above the electric motor 13. In any of these cases, the electric motor 13 is disposed in a so-called upright orientation so that the direction of the rotational axis of the electric motor 13 substantially coincides with the direction of the rotational axis X of the revolving body 211, and the electric motor 13 and the hydraulic pump 14 are aligned with the direction of the rotational axis X of the revolving body 211. A large space can therefore be maintained for arranging the remaining devices in a plane inside the revolving body 211.

The hydraulic fluid tank 73 for storing the hydraulic fluid for operating the hydraulic devices is disposed below the rear part of the operator seat 17 so as to extend vertically, and the hydraulic control valves 80 composed of the revolving drive control valve 87 and other valves described above are provided to the left front end part at the bottom inside the revolving body 211. The revolving motor 37 is also disposed in the lower part in the revolving body 211 and diagonally downward and to the right of the operator seat 17.

The oil cooler 71 capable of recirculating the hydraulic fluid, in which the radiator of the hydraulic fluid faces to the rear of the revolving body 211, is disposed at the right front end of the lower part inside the revolving body 211. The cooling fan 72 driven by electrical power from the battery 50 is provided to the rear surface of the oil cooler 71. A ventilation hole (not shown) is formed in the front surface of the revolving body 211, and the oil cooler 71 is placed in the vicinity of the ventilation hole, whereby the heat of the hydraulic fluid can be efficiently released to the outside.

Example 4

Figure 16:
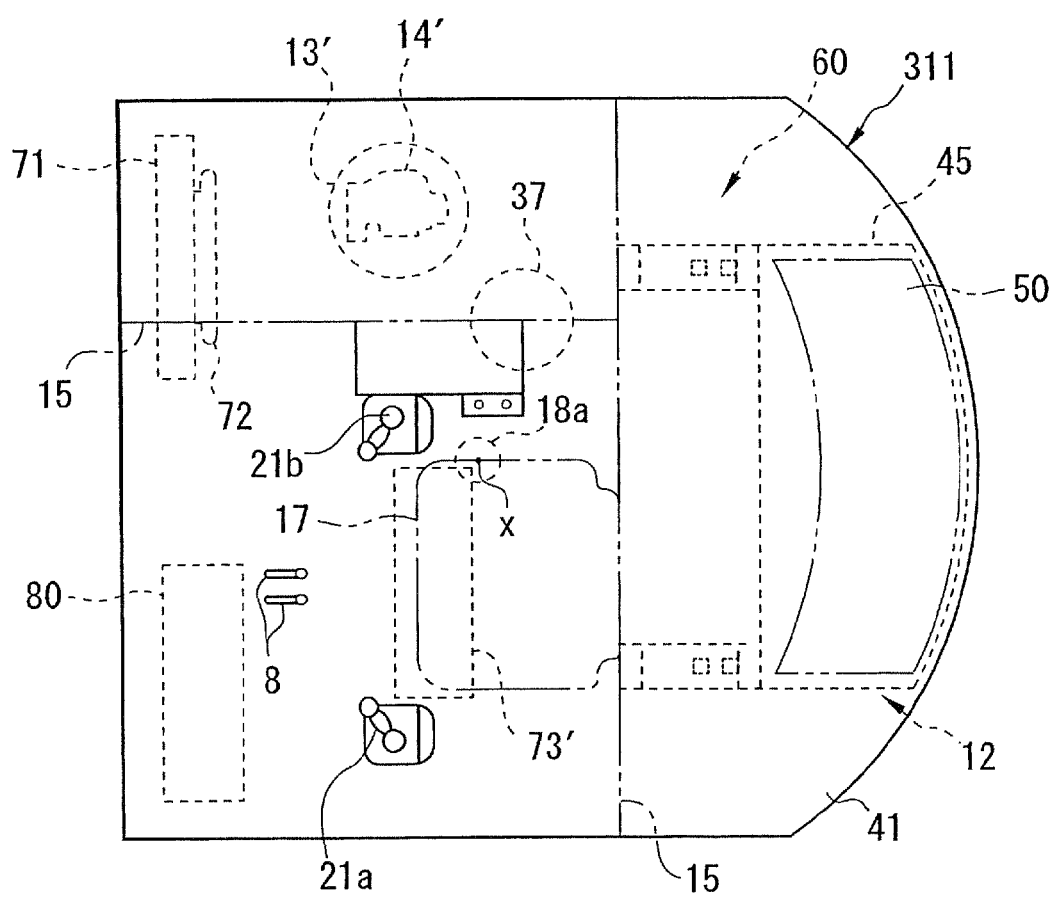
FIG. 16 is a plan view showing the revolving body provided to the industrial vehicle according to Example 4.
Figure 17:
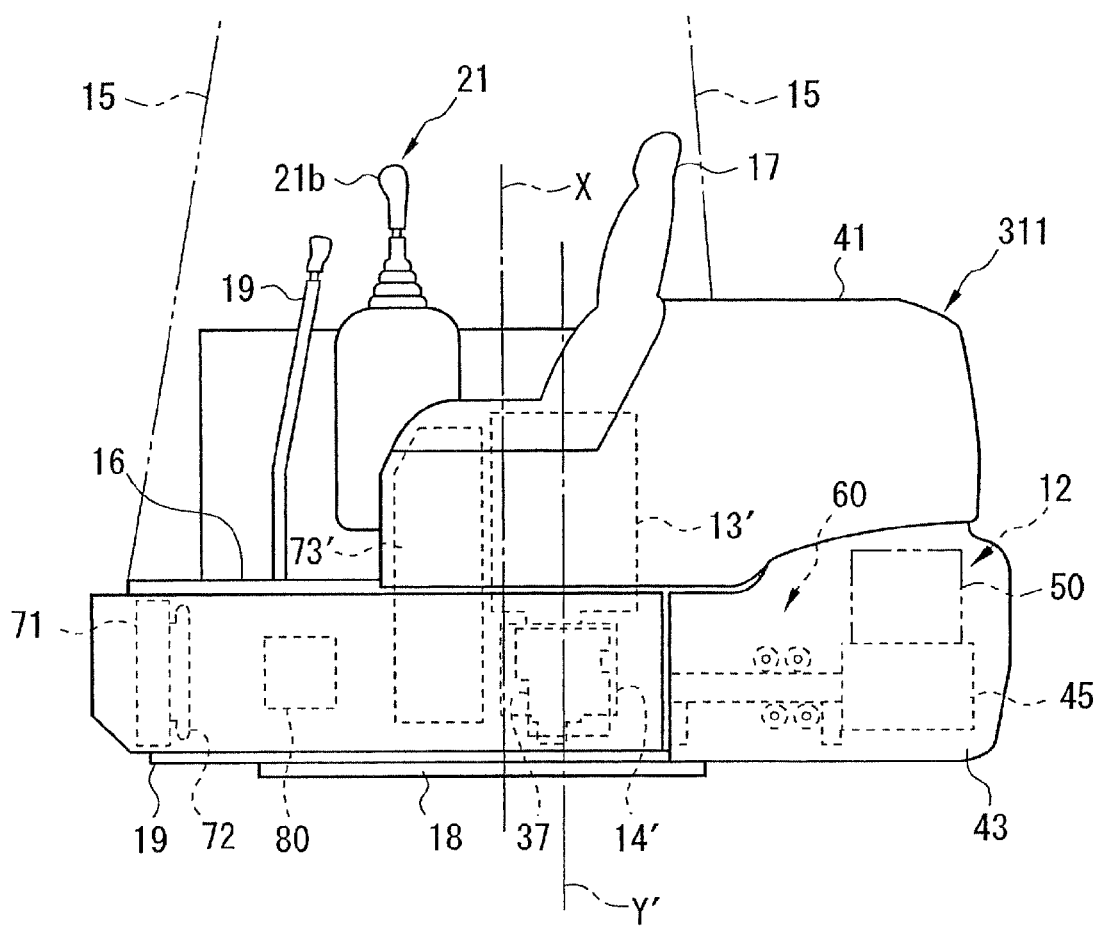
FIG. 17 is a side view showing the revolving body provided to the industrial vehicle according to Example 4.

A fourth example of the power shovel industrial vehicle as the electrically driven industrial vehicle of the present invention will next be described using FIGS. 16 and 17, with emphasis on the portions that differ from Examples 1 through 3. As shown in FIGS. 16 and 17, the power shovel industrial vehicle in the present embodiment differs from Examples 1 through 3 with respect to the arrangement configuration of devices within the revolving body 311, but other aspects are the same as in the previous examples. Portions other than the internal configuration of the revolving body will therefore not be described. The same reference symbols are used to indicate internal components of the revolving body that are the same as those of Examples 1 through 3.

In Example 4, the electric motor 13, the hydraulic pump 14, the battery 50, the oil cooler 71, the hydraulic control valves 80, and the revolving motor 37 among the devices arranged in the revolving body 311 are positioned in the same manner as in Example 3, but the oil tank 73 is positioned differently.

In Example 4, an electric motor 13' is disposed in a so-called upright orientation in which the direction of the rotational axis Y thereof substantially coincides with the direction of the rotational axis X of the revolving body 11, at the right end inside the revolving body 311, the same as in Example 3. The hydraulic pump 14' is also disposed above or below the electric motor 13'. The hydraulic fluid tank 73' disposed below the front part of the operator seat 17, in contrast to Example 3. Specifically, the hydraulic fluid tank 73' is disposed inside the revolving body 311 in a position farther forward than the position of the oil tank in Example 1. The battery 50 is stored and disposed in the battery storage part 12 at the rear end of the lower part of the revolving body 311, the oil cooler 71 is disposed at the right front end of the lower part inside the revolving body 311, and the hydraulic control valves 80 are disposed at the left front end of the lower part inside the revolving body 311.

Example 5

Figure 18:
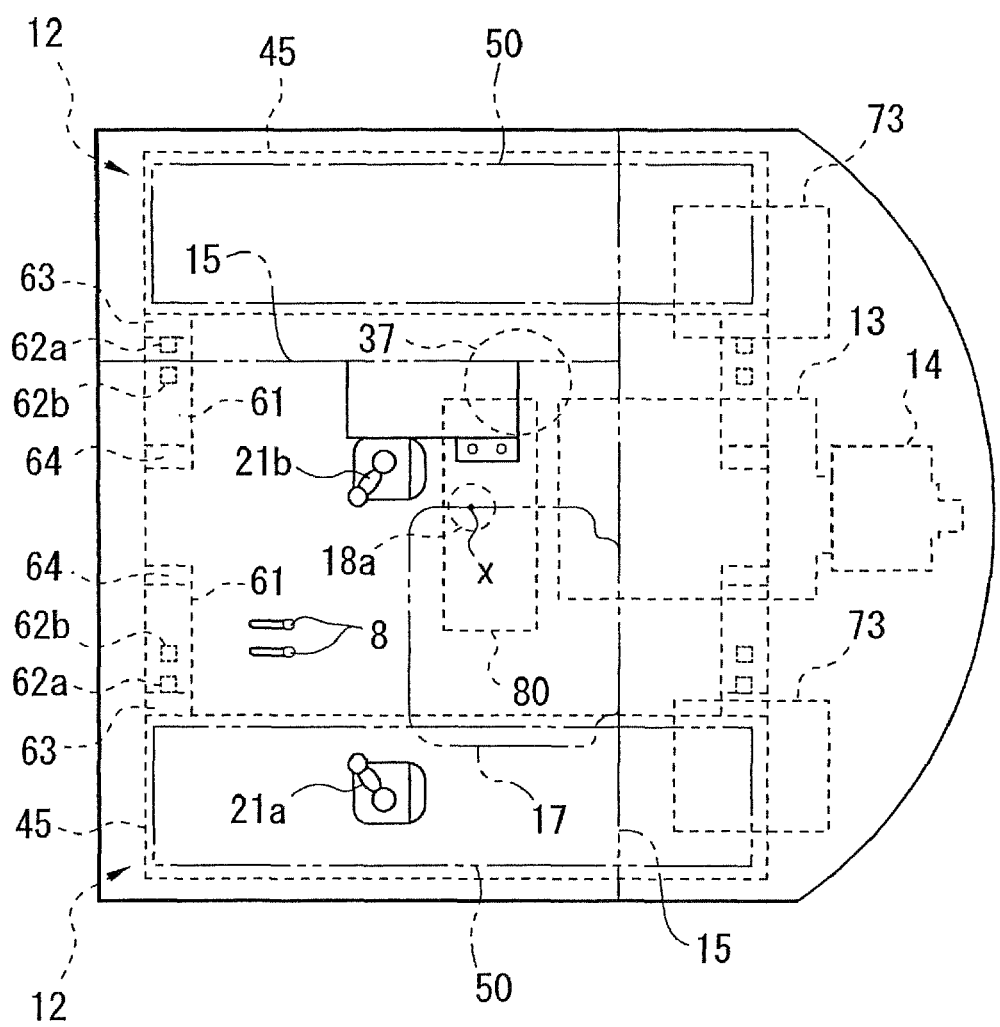
FIG. 18 is a plan view showing the revolving body provided to the industrial vehicle according to Example 5.
Figure 19:
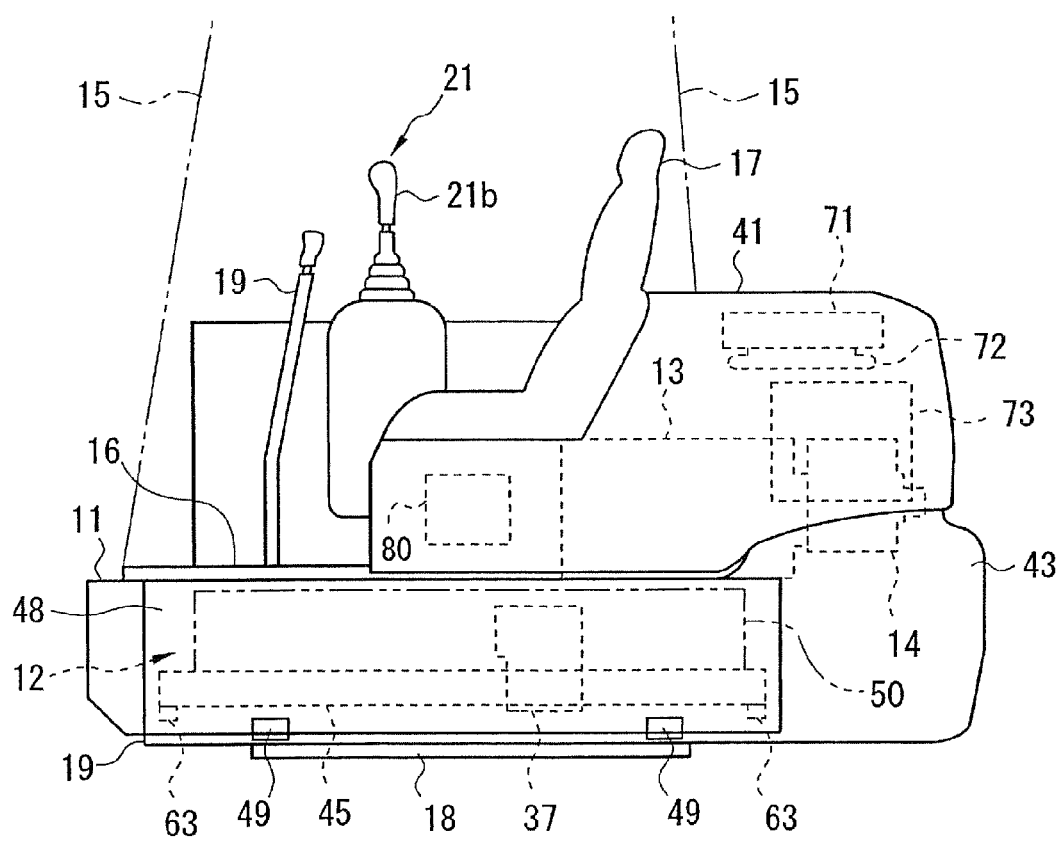
FIG. 19 is a side view showing the revolving body provided to the industrial vehicle according to Example 5.
Figure 20:
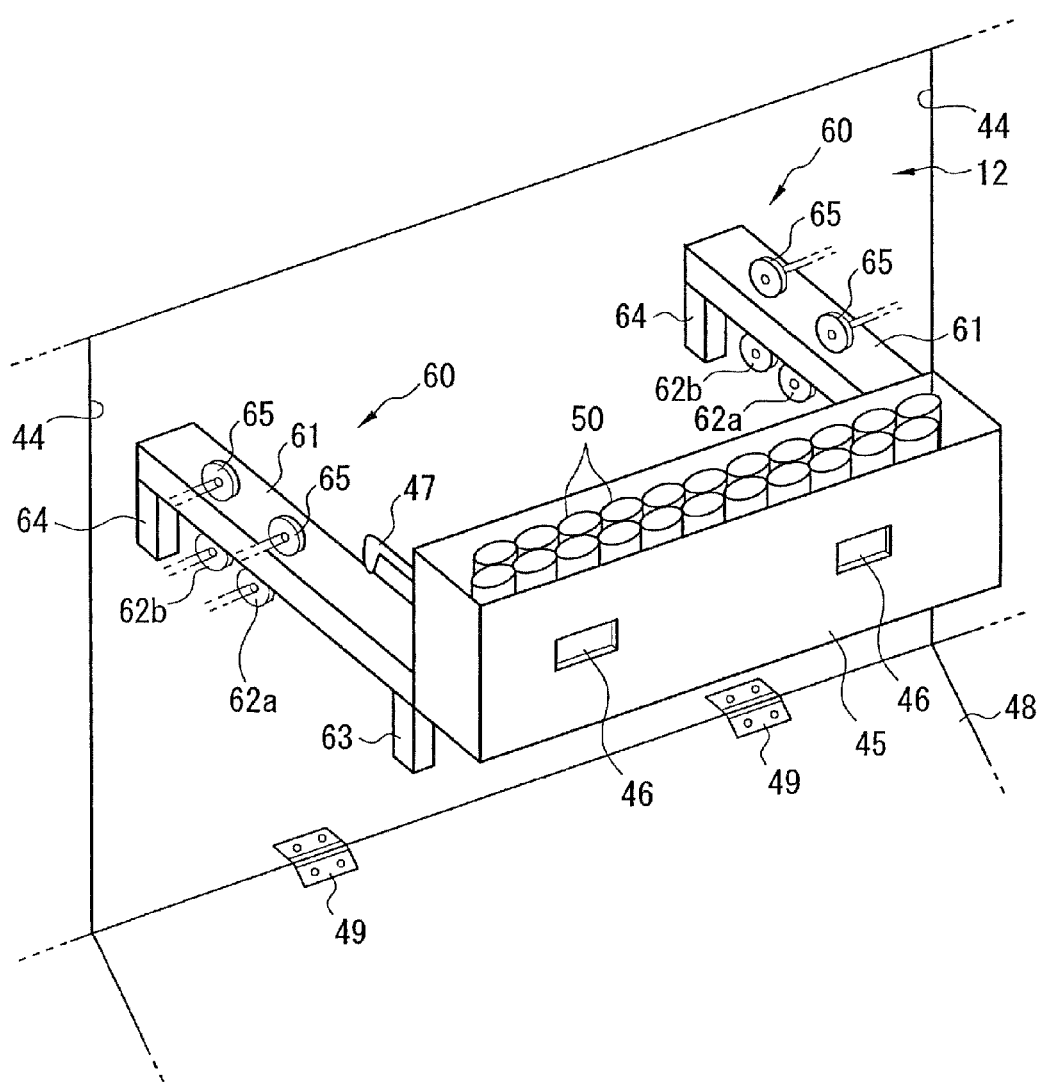
FIG. 20 is a perspective view showing the area around the battery storage part for storing the battery that is provided to the industrial vehicle according to Example 5.
Figure 21:
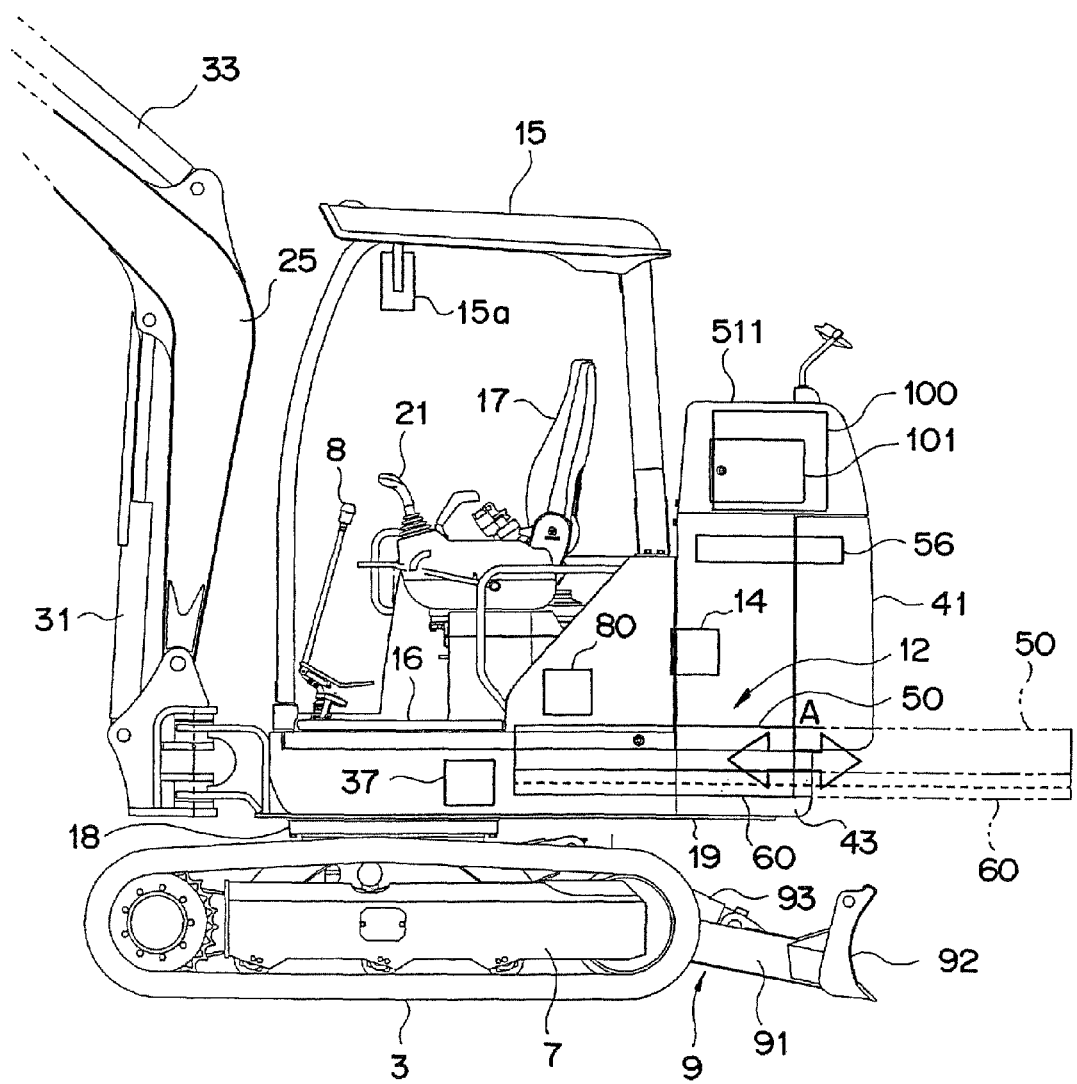
FIG. 21 is a side view showing the industrial vehicle according to Example 6.
Figure 22:
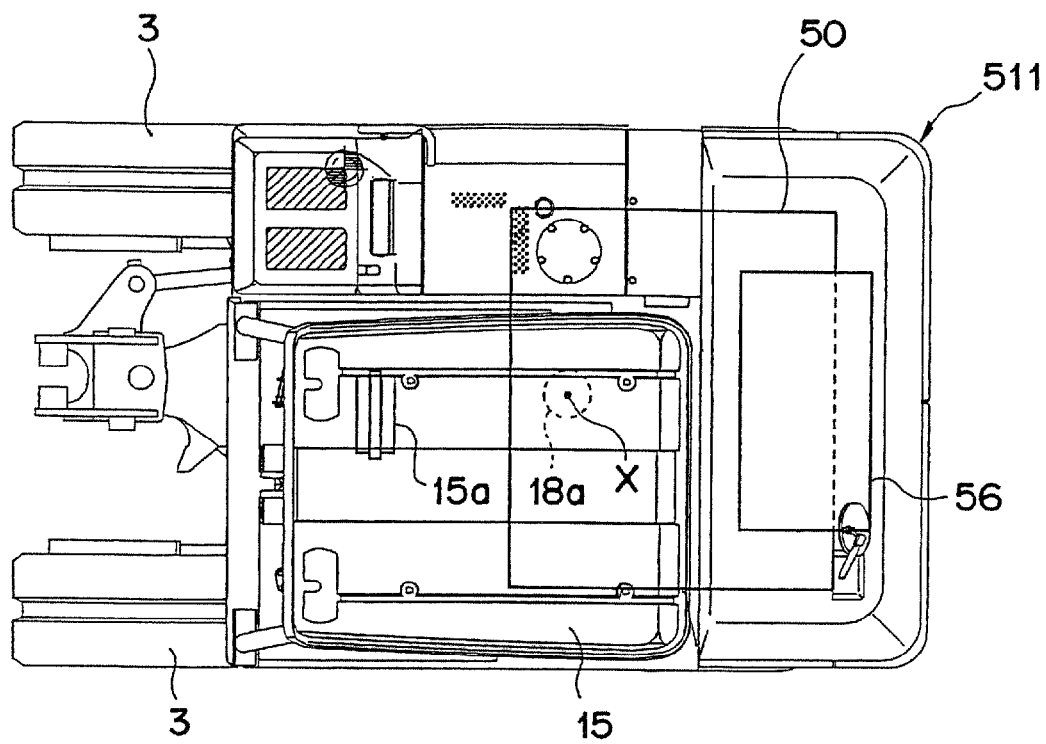
FIG. 22 is a plan view showing the industrial vehicle according to Example 6.
Figure 23:
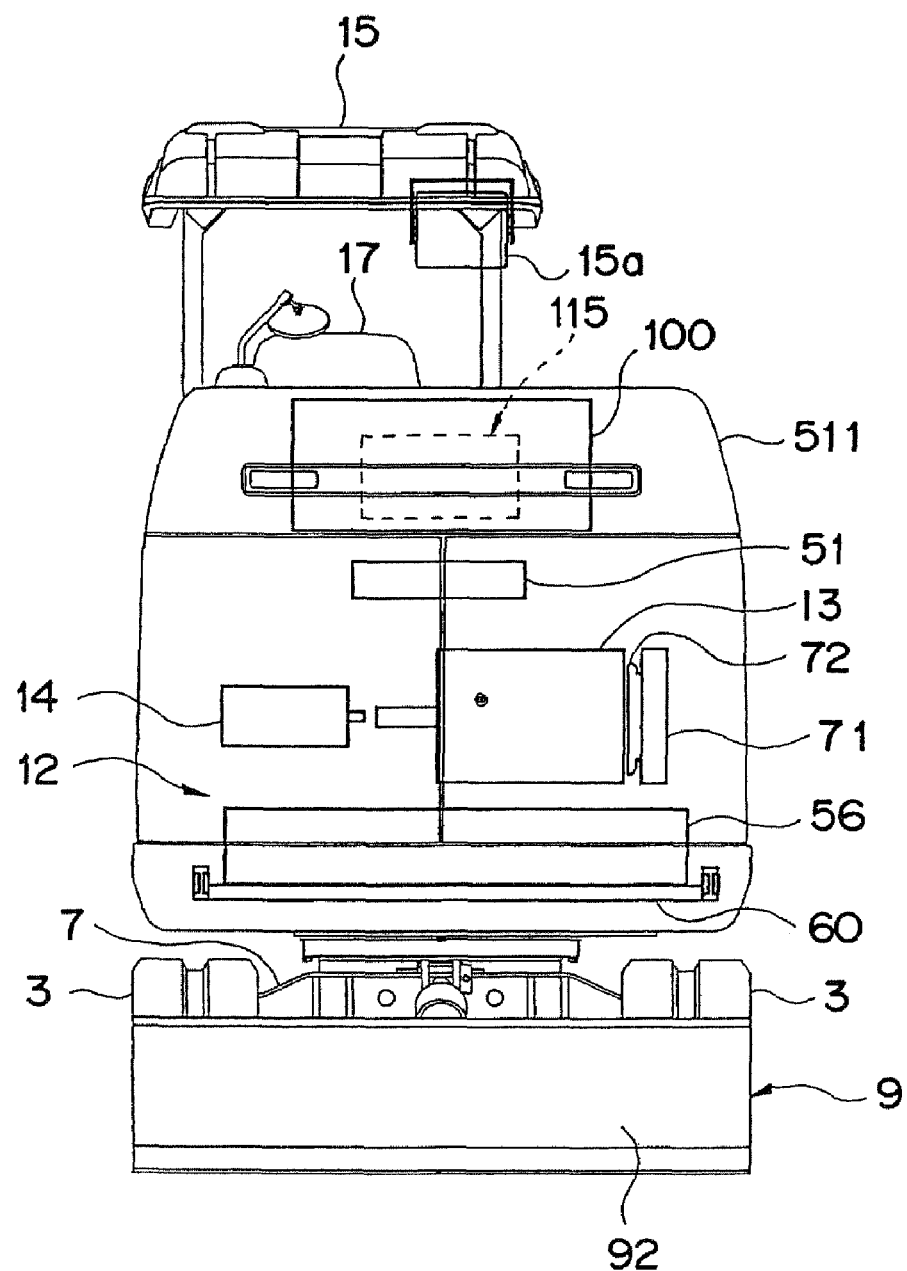
FIG. 23 is a back view showing the industrial vehicle according to Example 6.
Figure 24:
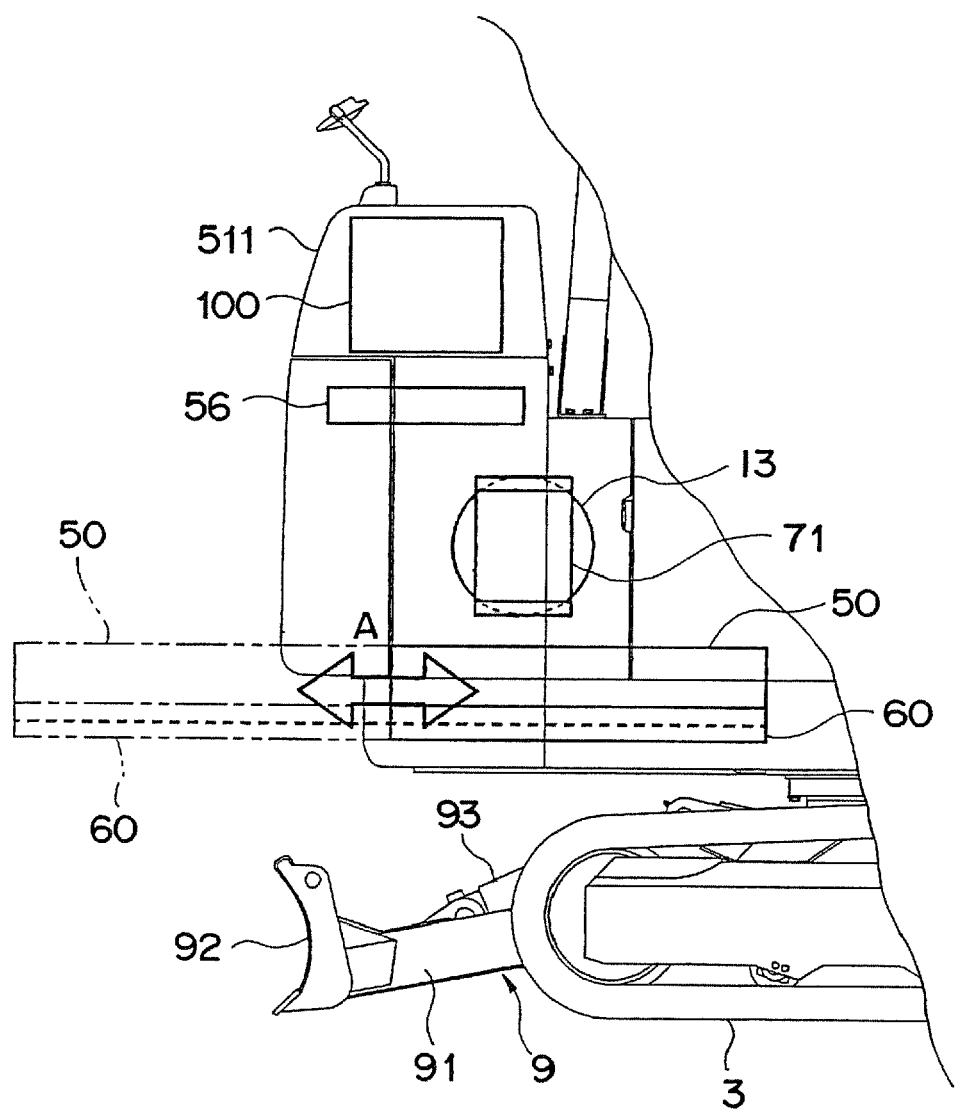
FIG. 24 is a left side view showing a portion of the industrial vehicle according to Example 6.

A fifth example of the power shovel industrial vehicle as the electrically driven industrial vehicle of the present invention will next be described using FIGS. 18 through 20, with emphasis on the portions that differ from Examples 1 through 4. As shown in FIGS. 18 through 20, the power shovel industrial vehicle in the present embodiment differs from Examples 1 through 4 with respect to the arrangement configuration of devices within the revolving body 411, but other aspects are the same as in the previous examples. Portions other than the internal configuration of the revolving body will therefore not be described. The same reference symbols are used to indicate internal components of the revolving body that are the same as those of Examples 1 through 4.

As shown in the drawings, the revolving body 411 is composed of the base plate 19, the main cover 41, and the lower cover 43, and the devices positioned on the base plate 19 are covered by the main cover 41 and other covers. The main cover 41 extends from below the operator seat 17 towards the rear end part of a revolving body 511, and covers the electric motor 13, the hydraulic pump 14, and other components. The lower cover 43 covers the rear end part of the revolving body 411 and extends to the left and right below the main cover 41.

Battery storage parts 12 are provided on the left and right sides in the lower part of the main cover 41, and batteries 50 are arranged so as to extend in the front-rear direction in the battery storage parts 12. The battery storage parts 12 are covered by storage lids 45 extending to the front and rear along the sides of the revolving body 411. The batteries 50 are lithium ion batteries, and can be withdrawn and inserted in the left-right direction with respect to the revolving body 411 through the use of the slide mechanism 60 described hereinafter. Since the batteries 50 have the same weight and size, and are positioned on both the left and right sides of the revolving body 411, the weight of the revolving body 511 on the left and right can be appropriately balanced, and the stability of the vehicle can be enhanced.

The oil cooler 71 for cooling the hydraulic fluid for operating the boom 25 and other components is disposed in the upper part inside the revolving body 411 with the radiator of the hydraulic fluid disposed upward. The cooling fan 72 rotationally driven by electric power from the batteries 50 is provided on the lower surface of the oil cooler 71, and the cooling fan 72 blows cool air toward the radiator of the oil cooler 71.

The electric motor 13 driven by electric power fed from the batteries 50 is disposed below the oil cooler 71 in the upper part of the revolving body 411 in a horizontal orientation in the front-rear direction (so that the longitudinal direction of the motor shaft coincides with the front-rear direction of the revolving body 411), and the hydraulic pump 14, which is driven by the electric motor 13 and supplies the oil pressure of the hydraulic fluid for operating the revolving motor 37, the boom cylinder 31, the arm cylinder 33, the bucket cylinder 35, and other hydraulic devices, is attached behind the electric motor 13. The revolving motor 37 is disposed in the lower part of the revolving body 411 below and diagonally to the right of the operator seat 17. The electric motor 13, the hydraulic pump 14, and the oil cooler 71 are all covered by the upper cover 41.

Hydraulic fluid tanks 73 for storing the hydraulic fluid for operating the hydraulic devices are disposed extending vertically in the upper part of the revolving body 411 above the rear end parts of the left and right batteries 50, and the hydraulic control valves 80 composed of the above-mentioned revolving drive control valve 87 and other valves are provided extending left and right in front of the electric motor 13. Since the lower part of the inside of the revolving body 411 is thus utilized for the battery storage parts 12 in Example 5, the devices such as the electric motor 13, the hydraulic pump 14, the oil cooler 71, and the hydraulic control valves 80 are arranged using the upper part of the inside of the revolving body 411.

In Example 5, since it is sufficient for the batteries 50 to be disposed on both the left and right sides in the lower part of the revolving body 411, and for the hydraulic control valves 80, the oil tank 73, the electric motor 13, the hydraulic pump 14, and the oil cooler 71 to be disposed above the battery storage parts 12 inside the revolving body 411, the arrangement of the abovementioned components is not limited to the configuration shown in FIGS. 18 and 19, and aside from the fact that the oil cooler 71 is positioned in the upper end part of the revolving body 411 in particular for the sake of heat dissipation, a configuration may be adopted in which the sequence in which the hydraulic control valves 80, the oil tank 73, the electric motor 13, and the hydraulic pump 14 are arranged is arbitrarily changed.

As shown in FIG. 20, battery storage openings 44 are formed on the left and right sides of the revolving body 411 (FIG. 20 shows only one of the left and right battery storage openings 44), and the battery storage openings 44 can be opened vertically by hinges 49, 49 by pivoting a pivotable storage lid 48 downward. The batteries 50 can be taken out of or stored in the battery storage parts 12 by taking out or placing the batteries 50 in the front-rear direction via the battery storage openings 44 when the battery storage openings 44 are open.

FIG. 20 shows a slide mechanism 60 for allowing a box-shaped drawer part 45 for accommodating the batteries 50 to move forward and backward, but because the mechanism 60 has the same configuration as the ones described in Example 1 and other examples, the same reference symbols are used to indicate the same parts, and no description thereof will be given.

Example 6

A sixth example of the power shovel industrial vehicle as the electrically driven industrial vehicle of the present invention will next be described using FIGS. 21 through 25, with emphasis on the portions that differ from Examples 1 through 5. As shown in FIGS. 21 through 25, the power shovel industrial vehicle in the present embodiment differs from Examples 1 through 5 with respect to the arrangement configuration of devices within the revolving body 511, but other aspects are the same as in the previous examples. The same reference symbols are therefore used to indicate internal components of the revolving body that are the same as those of Examples 1 through 5.

The power shovel industrial vehicle 1 of Example 6 has the undercarriage 7 provided with the travel device 5 having the pair of left and right crawler tracks 3; a revolving body 511 composed of a vehicle body frame provided on the undercarriage 7 so as to be able to turn; the power shovel device 20 pivotally connected to the front part of the revolving body 511; the loader 6; and the operator cabin 15 provided to the upper part of the revolving body 511.

The display 15a visible to the working operator who is seated in the operator seat 17 is provided to the ceiling part in the operator cabin 15, and the operator can work while checking the status (whether charging is needed) of the battery 50.

A loader 9 has left and right booms 91, 91 whose proximal ends are pivotally connected to the undercarriage 7 so as to be able to rotate about an axis in the left-right direction; and a bucket 92 pivotally connected to the distal ends of the left and right booms 91, 91 so as to be able to rotate about an axis in the left-right direction. The booms 91 are pivoted up and down by the extension and retraction of a boom cylinder 93 situated between the undercarriage 7 and the booms 91, and the bucket 92 is pivoted up and down by the extension and retraction of a bucket cylinder (not shown) situated between the booms 91 and the bucket 92.

An example of the structure of the revolving body 511 and the arrangement of the various devices arranged therein will next be described. As shown in the drawings, the revolving body 511 is composed of the base plate 19, the main cover 41, and the lower cover 43, and the devices arranged on the base plate 19 are covered by the main cover 41 and other covers.

The main cover 41 extends toward the rear end of the revolving body 11 from below the operator seat 17, and covers the electric motor 13, the hydraulic pump 14, and other components. The lower cover 43 extends in the front-rear direction below the main cover 41 on the left and right sides of the revolving body 511. The revolving body 511 below the operator cabin 15 is formed by the floor panel 16, and the operator can use the floor panel 16 to climb into the operator cabin 15.

The electric motor 13 driven by a supply of electric power from the battery 50 is disposed in a horizontal orientation in the left-right direction in the upper part of the revolving body 511 (so that the longitudinal direction of the motor shaft coincides with the left-right direction of the revolving body 511), and the hydraulic pump 14, which is driven by the electric motor 13 and feeds the oil pressure of the hydraulic fluid for operating the revolving motor 37, the boom cylinder 31, the arm cylinder 33, the bucket cylinder 35, and other hydraulic devices, is attached to the left of the electric motor 13. The electric motor 13, the hydraulic pump 14, and the oil cooler 71 are all covered by the upper cover 41.

The oil cooler 71 for cooling the hydraulic fluid for operating the boom 25 and other components is disposed to the right of the electric motor 13. The oil cooler 71 is provided so as to extend in the front-rear direction of the revolving body 511, and the radiator is oriented in the left-right direction of the revolving body 511. The cooling fan 72 driven by electrical power from the battery 50 is provided to the back surface (between the oil cooler 71 and the electric motor 13) of the oil cooler 71. The hydraulic control valves 80 composed of the revolving drive control valve 87 and other valves are provided in front of the hydraulic pump 14 and above the battery 50 (below the operator seat 17).

The planar battery storage part 12 is formed in the lower part of the floor panel 16 of the revolving body 511, and batteries 50 are accommodated in the battery storage part 12. The batteries 50 are high-capacity rechargeable lithium ion batteries or organic radical batteries, and can be withdrawn and inserted in the front-rear direction (direction of arrow A) with respect to the revolving body 511 through the use of the slide mechanism 60 described hereinafter. Since the batteries 50 are arranged in a plane and positioned in the lower part of the revolving body 511, the center of gravity of the revolving body 11 can be positioned low, and the stability of the vehicle can be enhanced.

A controller 100 for controlling the overall operation of the power shovel device 20 is provided above the electric motor 13 and hydraulic pump 14 (at the top of the revolving body 511) at the rear end of the revolving body 511. The controller 100 receives operating signals based on the operation of the operating device 21, and outputs control signals to the hydraulic control valves 80. The hydraulic control valves 80 control the feeding of hydraulic fluid to the boom cylinder 31 and other components on the basis of the control signals from the controller 100, and can perform such operations as causing the boom 25 to be raised and lowered. A door 101 that can be opened and closed is provided to the top part of the rear end of the revolving body 511, and by opening the door 101, the controller 100 provided inside the revolving body 511 can be serviced and various settings can be changed. The motor variable-speed control device 115 for receiving control signals outputted from the controller 100 and varying and controlling the speed of the electric motor 13 so that the electric motor 13 outputs the appropriate torque is provided in the vicinity of the controller 100. A battery charge/discharge controller 51 electrically connected to the controller 100 is provided above the batteries 50, the control signals from the controller 100 can be received, and the charging and discharging of the batteries 50 can be controlled.

As described above, since the lower part of the floor panel 16 of the revolving body 511 (lower part of the inside of the revolving body 511) is used as the battery storage part 12 in the present invention, the upper part of the inside of the revolving body 511 is used to arrange devices such as the electric motor 13, the hydraulic pump 14, the oil cooler 71, and the hydraulic control valves 80.

In the present invention, since the battery 50 is disposed in the battery storage part 12 formed in a planar shape in the lower part of the floor panel 16 of the revolving body 511, the devices other than the battery 50, such as the hydraulic control valves 80, the electric motor 13, the hydraulic pump 14, and the oil cooler 71, are not limited to such arrangements as those described above (as shown in FIGS. 3 through 6), and aside from the fact that the oil cooler 71 is positioned near the side surface of the revolving body 511 for the sake of heat dissipation, the hydraulic control valves 80, the electric motor 13, and the hydraulic pump 14 may be arranged in any appropriate sequence.

A battery storage opening 44 such as the one shown in FIG. 7 is formed in the rear end of the revolving body 511, and the battery storage opening 44 can be opened by pivoting a storage lid 48 upward that can pivot vertically through the use of hinges 49, 49 arranged on the left and right of the lower end part of the battery storage opening 44 (a configuration may also be adopted in which a hinge 49 is provided to the open end at the top of the battery storage opening 44, and the storage lid 48 is pivoted upward). A battery 50 can be taken out of or stored in the battery storage part 12 covered by the lower cover 43 by taking out or placing the battery 50 in the front-rear direction via the battery storage opening 44 in a state in which the battery storage opening 44 is opened.

Figure 25:
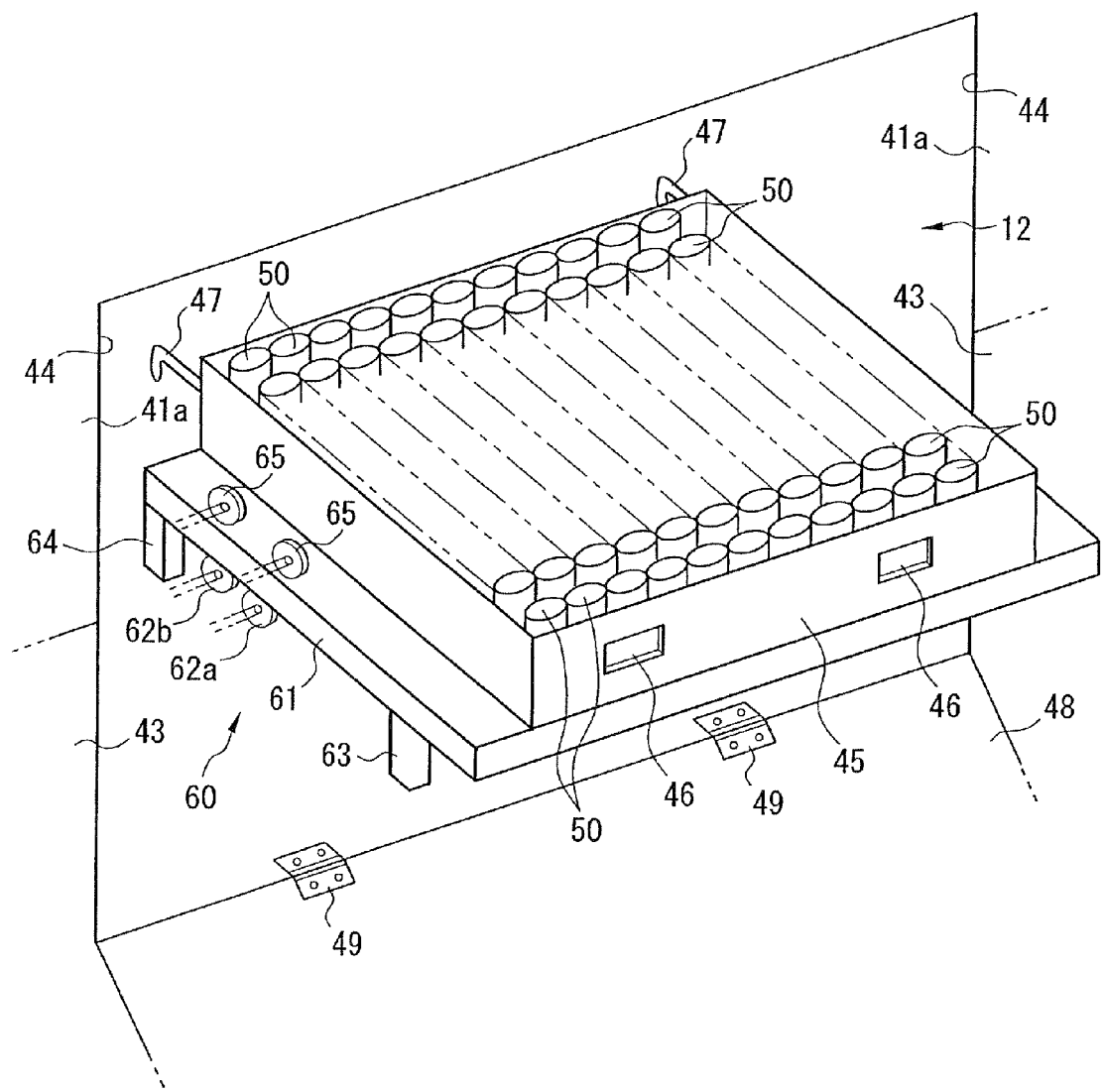
FIG. 25 is a perspective view showing the area around the battery storage part for storing the battery that is provided to the industrial vehicle according to Example 6.

FIG. 25 shows a slide mechanism 60 for allowing a box-shaped drawer part 45 for accommodating the batteries 50 to move forward and backward, but because the mechanism 60 has the same configuration as the ones described in Example 1 and other examples, the same reference symbols are used to indicate the same parts, and no description thereof will be given.

Examples of a power shovel industrial vehicle 1 were described as the industrial vehicle in the examples described above, but the industrial vehicle according to the present invention is not limited by these examples, and may also be a manlift, a movable crane, a forklift, a loader, or the like. In a manlift, for example, a revolving body is provided on a vehicle body frame, and a boom or other implement is attached to the revolving body, but the devices constituting the drive force generating unit provided in the vehicle body frame may be arranged as in the examples described above. In a forklift, for example, an implement composed of a fork or the like is attached to the front of the vehicle body frame, but the devices constituting the drive force generating unit provided in the vehicle body frame may be arranged as in the examples described above.

The invention claimed is:
1. An industrial vehicle comprising:
a vehicle body provided on a traveling body;
an implement for receiving a hydraulic drive force, the implement being attached to said vehicle body; and
a hydraulic drive force generating unit for generating the hydraulic drive force for operating said implement, the hydraulic drive force generating unit being provided to said vehicle body;
wherein said hydraulic drive force generating unit has a hydraulic fluid tank for storing hydraulic fluid; a hydraulic pump for feeding the hydraulic fluid in said hydraulic fluid tank to said implement; an electric motor for driving said hydraulic pump; and power storage means for feeding electric drive power to said electric motor;

said hydraulic pump, said electric motor, and said hydraulic fluid tank are disposed on a same plane inside said vehicle body and in a position lower than said power storage means; and said power storage means is composed of at least one of a high-capacity secondary battery and a high-capacity capacitor.

2. The electrically driven industrial vehicle according to claim 1, wherein said high-capacity secondary battery is composed of a lithium ion battery or an organic radical battery.

3. The electrically driven industrial vehicle according to claim 1, wherein a battery storage part is formed for storing said power storage means in said vehicle body; and a battery storage opening that opens facing said battery storage part is formed in an external peripheral surface of said vehicle body, and said power storage means can be inserted into and withdrawn from said battery storage part through said battery storage opening.

4. The electrically driven industrial vehicle according to claim 1, wherein said vehicle body is composed of a revolving body attached on said traveling body, the revolving body is adapted to turn horizontally via a revolving mechanism.

5. The electrically driven industrial vehicle according to claim 4, wherein at least a portion of an external peripheral surface of said revolving body is formed as a surface curved about an axis of revolution thereof;

the battery storage part is formed in a curved surface along said external peripheral surface inside said revolving body;

said power storage means is composed of a plurality of battery cells; and said plurality of battery cells is arranged in a line along an external peripheral surface of said curved surface inside said battery storage part.

6. The electrically driven industrial vehicle according to claim 4 or 5, wherein said implement is attached to a front part of said revolving body; and an external peripheral surface of a rear part of said revolving body is formed in a curved surface, said battery storage part is formed along the curved surface, and said power storage means accommodated in said battery storage part functions as a counterweight.

7. The electrically driven industrial vehicle according to claim 1, wherein said power storage means is composed of a plurality of electrically connected battery cells having mutually equal electrical capacities; and said plurality of battery cells has equal surface areas and different shapes as viewed from above, is formed in columnar shapes having equal thickness dimensions, and is configured to have mutually equal volumes.

8. The electrically driven industrial vehicle according to claim 7, wherein a battery storage part having a prescribed shape is formed within said vehicle body, and said plurality of battery cells is arranged compactly and efficiently as a combination of said plurality of different shapes in conformity to the shape of said battery storage part.

9. The electrically driven industrial vehicle according to claim 7 or 8, wherein said plurality of battery cells is arranged in a plurality of tiers disposed one above another inside said battery storage part.

10. The industrial vehicle according to any of claims 1 through 4, wherein said power storage means is stored and disposed at a rear end side inside said vehicle body.

* * * * *